United States Patent
Castle et al.

(10) Patent No.: US 11,576,749 B2
(45) Date of Patent: Feb. 14, 2023

(54) DENTAL SURGERY METHOD AND DEVICE

(71) Applicant: Castle Wall Pty Ltd, The Gap (AU)

(72) Inventors: Cameron Glenn Castle, The Gap (AU); David Ogle, The Gap (AU); Glenn Alan Castle, The Gap (AU)

(73) Assignee: Castle Wall Pty Ltd, Aspley (AU)

( * ) Notice: Subject to any disclaimer, the term of this patent is extended or adjusted under 35 U.S.C. 154(b) by 319 days.

(21) Appl. No.: 16/809,277

(22) Filed: Mar. 4, 2020

(65) Prior Publication Data

US 2020/0197130 A1 Jun. 25, 2020

Related U.S. Application Data

(63) Continuation-in-part of application No. PCT/AU2019/050112, filed on Feb. 13, 2019.

(30) Foreign Application Priority Data

| May 15, 2018 | (AU) | 2018901687 |
| Feb. 13, 2020 | (AU) | 2018201058 |
| Feb. 21, 2020 | (AU) | 2020201283 |

(51) Int. Cl.
*A61C 5/80* (2017.01)
*A61C 3/14* (2006.01)

(52) U.S. Cl.
CPC . *A61C 5/80* (2017.02); *A61C 3/14* (2013.01)

(58) Field of Classification Search
CPC .................................. A61C 5/80; A61C 3/14
USPC ....................................................... 433/152
See application file for complete search history.

(56) References Cited

U.S. PATENT DOCUMENTS

| 3,787,975 A * | 1/1974 | Zuest ................. A61C 13/2656 |
| | | 433/182 |
| 5,186,624 A * | 2/1993 | Gottsleben ............. A61C 19/05 |
| | | 433/69 |
| 7,303,395 B2 * | 12/2007 | Hornig ..................... A61C 3/14 |
| | | 433/152 |
| 8,439,679 B2 * | 5/2013 | Hoke, III ................. A61C 3/14 |
| | | 433/152 |
| 2004/0126741 A1 * | 7/2004 | Hornig ..................... A61C 3/14 |
| | | 433/152 |
| 2004/0157190 A1 * | 8/2004 | Fiumana .................. A61C 3/14 |
| | | 433/153 |

(Continued)

FOREIGN PATENT DOCUMENTS

| DE | 686412 C * | 1/1940 |
| DE | 686412 C | 1/1940 |

(Continued)

*Primary Examiner* — Matthew M Nelson
(74) *Attorney, Agent, or Firm* — Holzer Patel Drennan

(57) ABSTRACT

A device for detaching a tooth root. The device comprises: a lead screw having a threaded point for screwing into the tooth root, and a threaded shaft; a pivoting member including a bore through which the lead screw passes, the lead screw being retractable through the bore by rotational engagement of a threaded member with the threaded shaft of the lead screw; and a platform for supporting the pivoting member such that the lead screw is able to pivot relative to the platform, The lead screw includes a locking surface for preventing rotation of the lead screw during rotational engagement of the threaded member with the threaded shaft.

16 Claims, 37 Drawing Sheets

(56) References Cited

U.S. PATENT DOCUMENTS

| | | | | |
|---|---|---|---|---|
| 2007/0218423 A1* | 9/2007 | Sapian | ............... | A61C 3/14 |
| | | | | 433/152 |
| 2008/0090206 A1* | 4/2008 | Hoke | ............... | A61C 3/12 |
| | | | | 433/152 |
| 2010/0119991 A1* | 5/2010 | Fletcher | ............... | A61C 3/14 |
| | | | | 433/145 |
| 2010/0266983 A1* | 10/2010 | Ng | ............... | A61C 3/14 |
| | | | | 433/141 |
| 2020/0197130 A1* | 6/2020 | Castle | ............... | A61C 3/14 |

FOREIGN PATENT DOCUMENTS

| | | | | |
|---|---|---|---|---|
| DE | 3740474 | * | 6/1989 | |
| DE | 202005020213 U1 | | 3/2006 | |
| DE | 202006001276 U1 | | 3/2006 | |
| DE | 202009003696 U1 | | 7/2010 | |
| EP | 0318709 A1 | * | 6/1989 | |
| EP | 0318709 A1 | | 6/1989 | |
| GB | 2357432 A | * | 6/2001 | ............ A61C 3/14 |
| WO | WO-2015013785 A1 | * | 2/2015 | ............ A61C 3/14 |

* cited by examiner

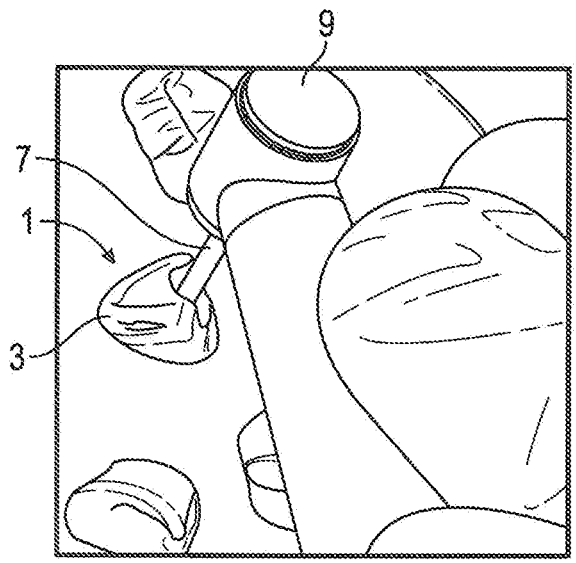 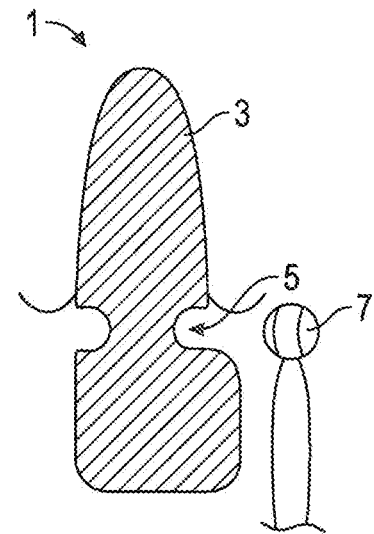
FIG. 1A  FIG. 1A.1
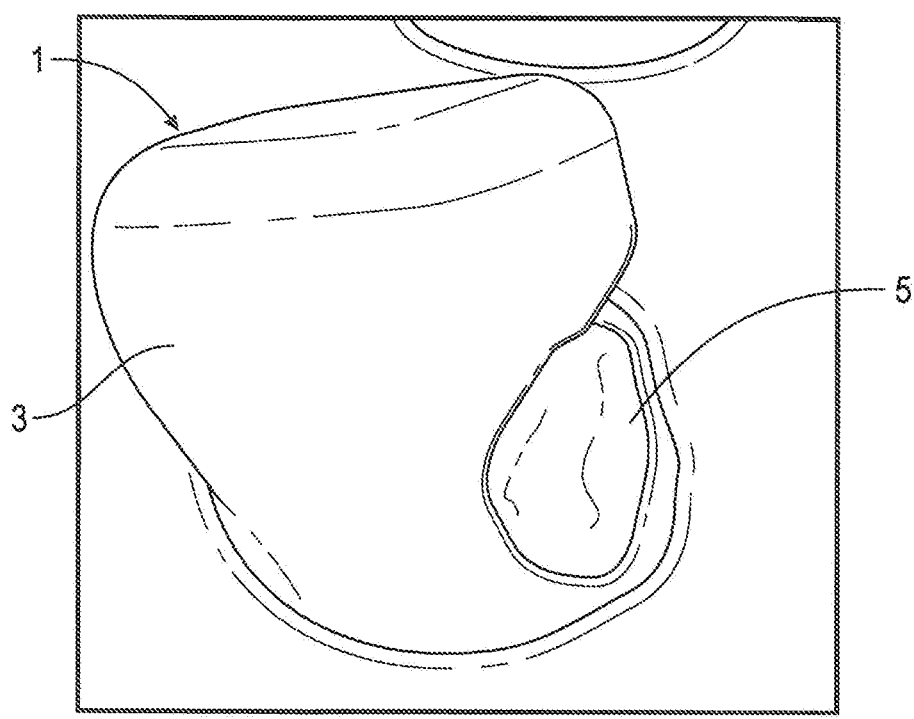
FIG. 1B

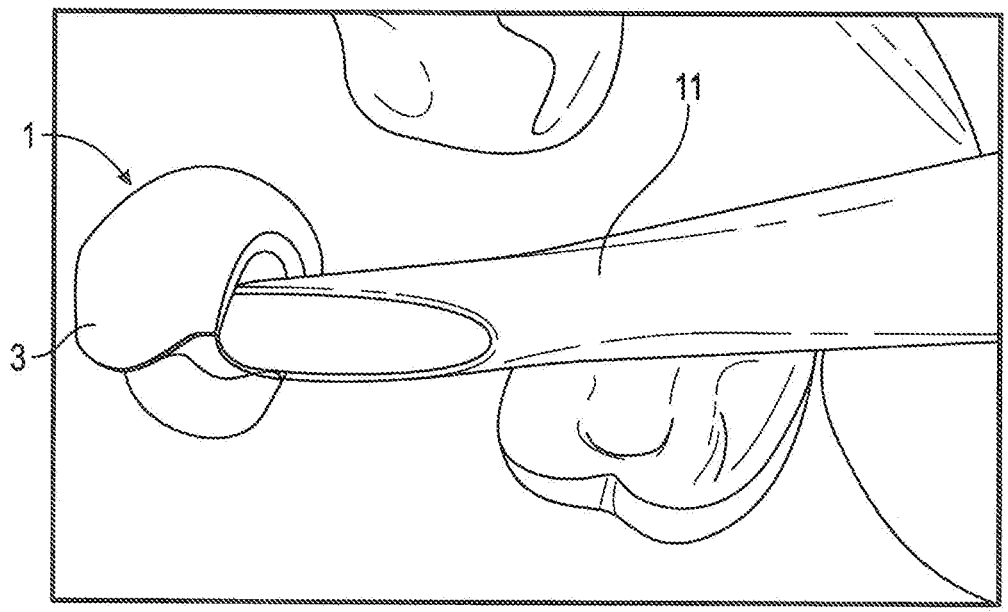
FIG. 2A
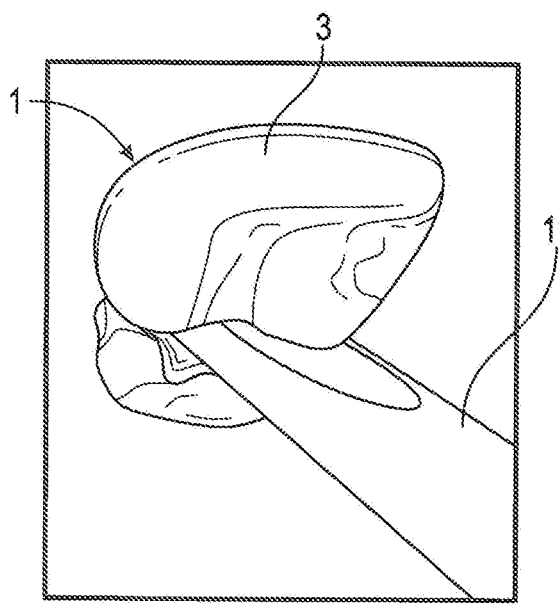
FIG. 2B
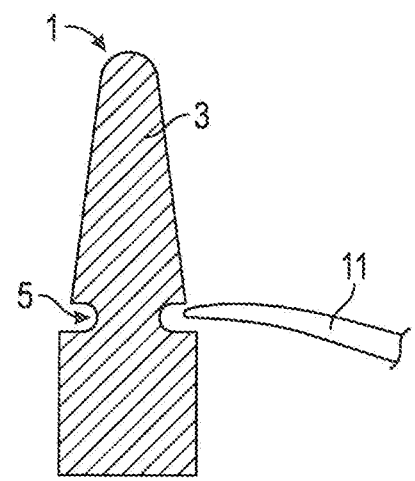
FIG. 2B.1

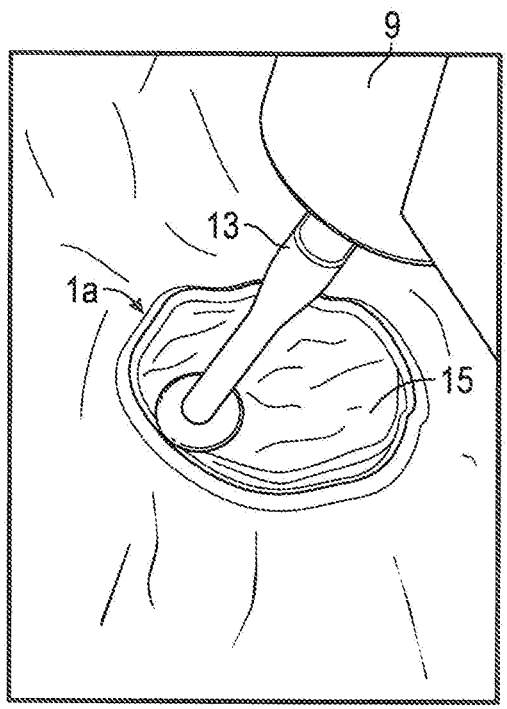
FIG. 3A
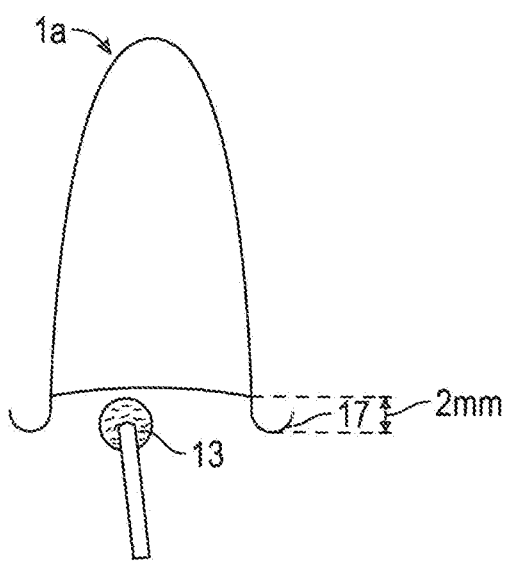
FIG. 3A.1
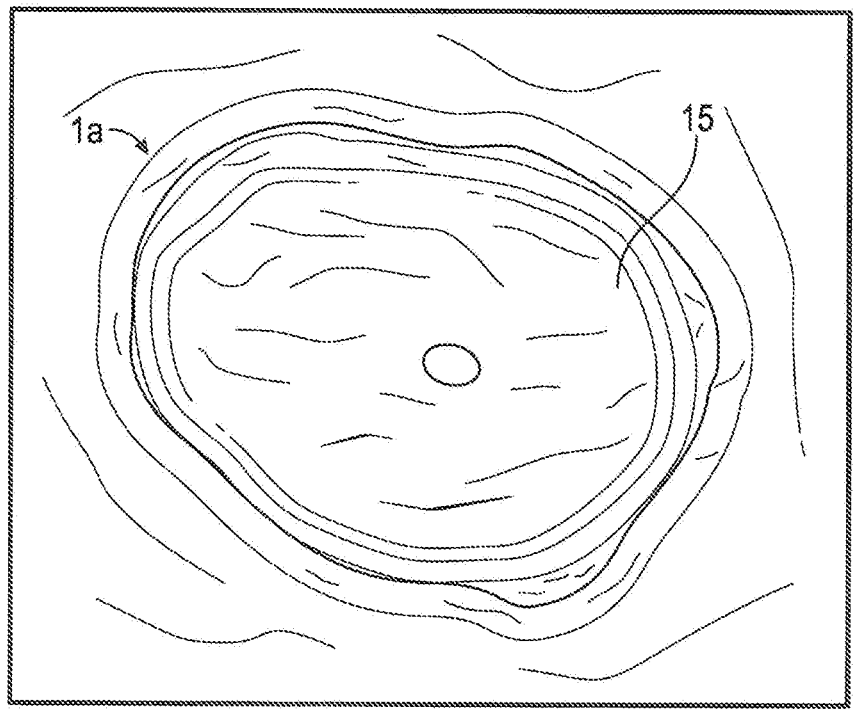
FIG. 3B

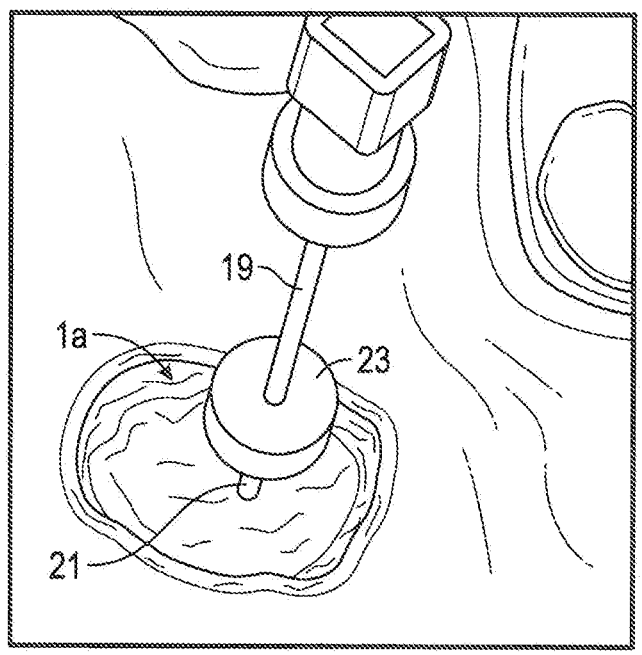
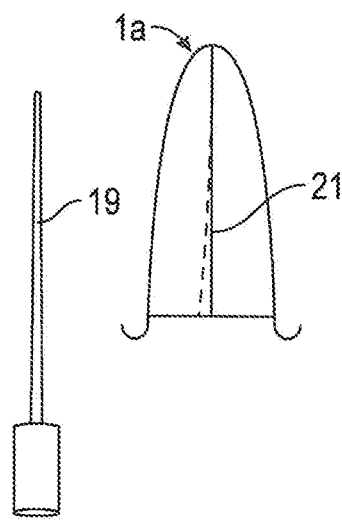
FIG. 4  FIG. 4.1
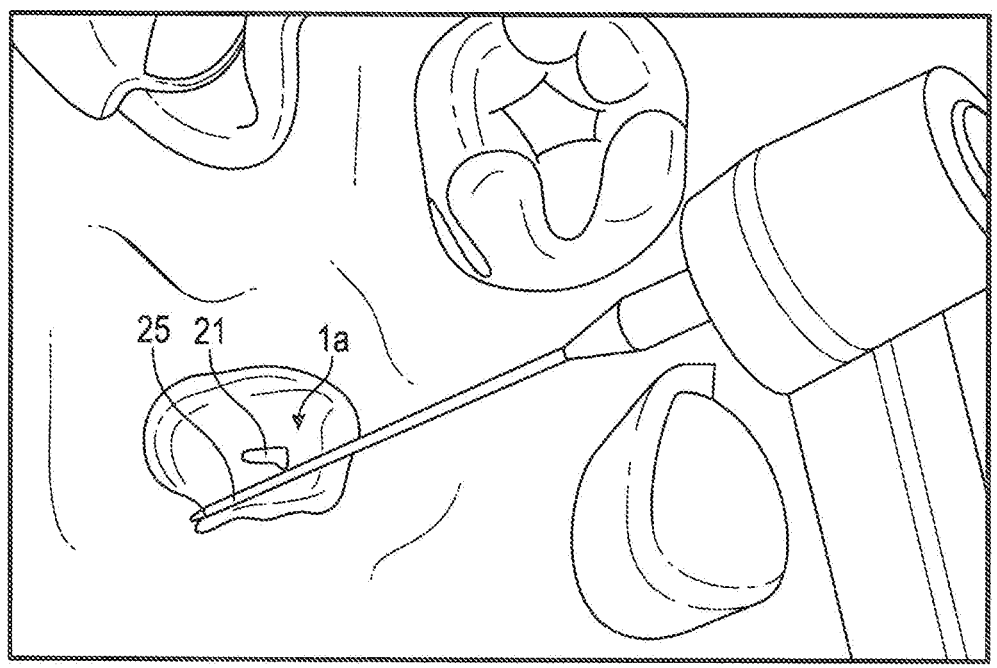
FIG. 5A

FIG. 5C.1

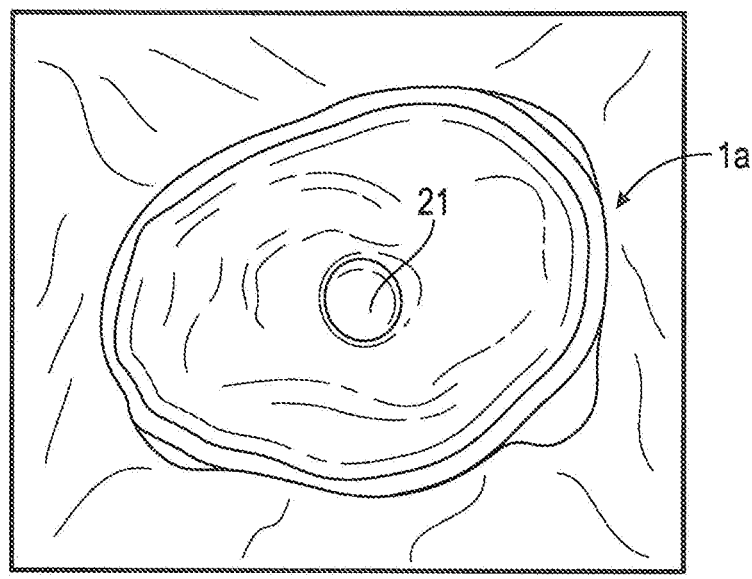
FIG. 5D
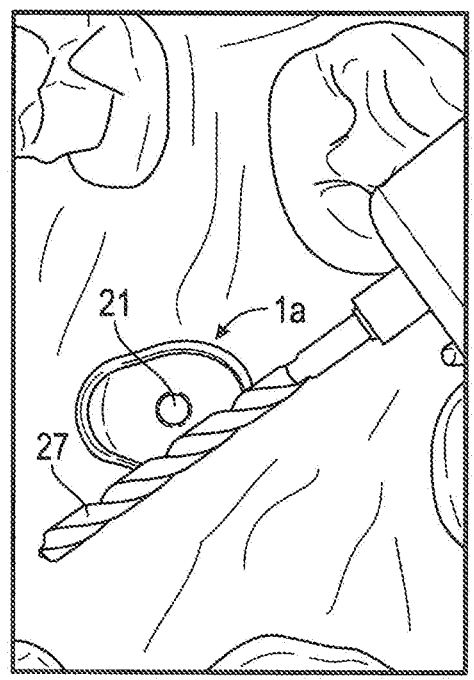
FIG. 6A
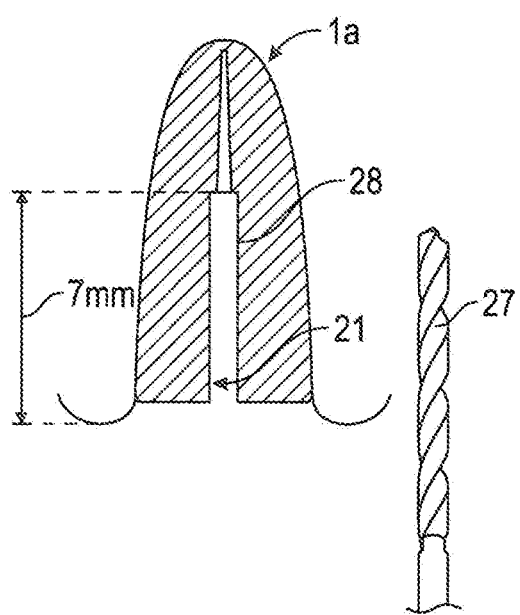
FIG. 6A.1

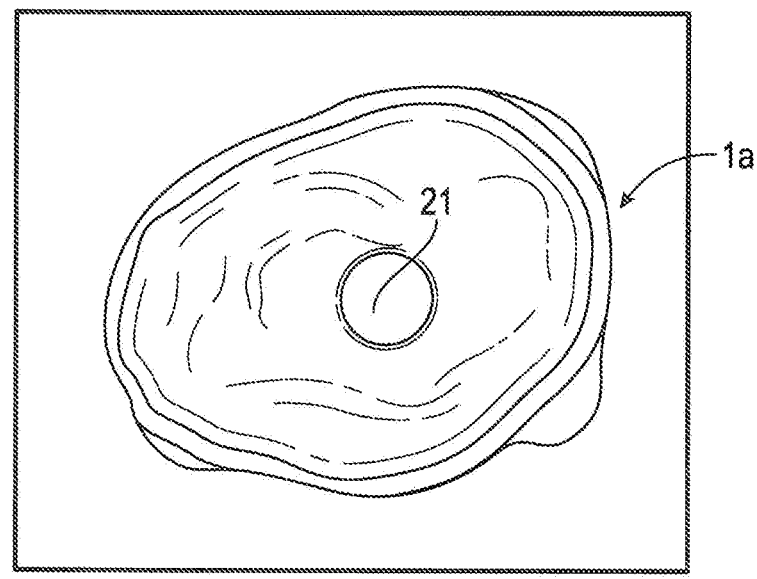
FIG. 6B
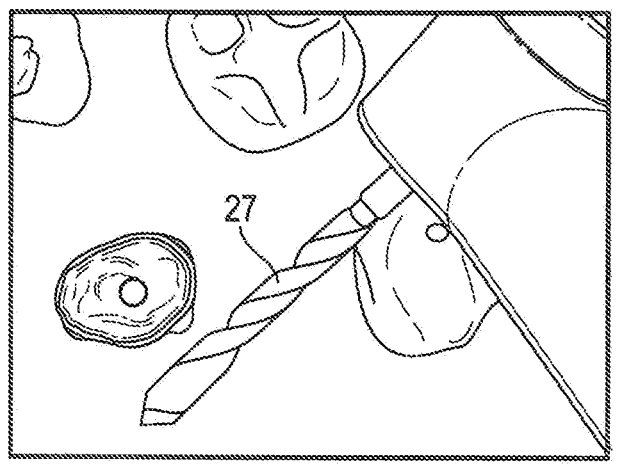
FIG. 7A
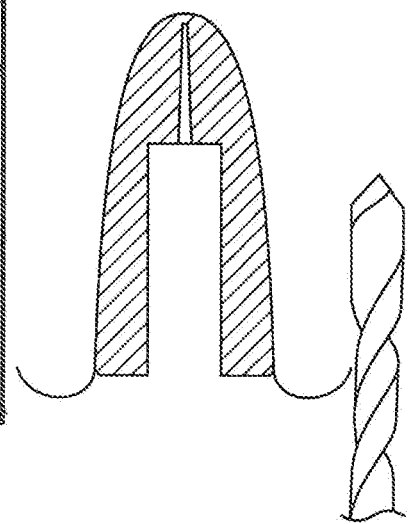
FIG. 7A.1

FIG. 8C.1

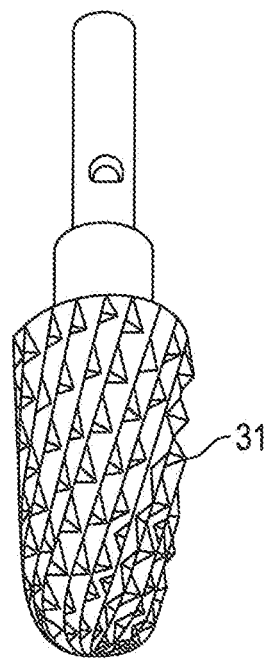
FIG. 9A
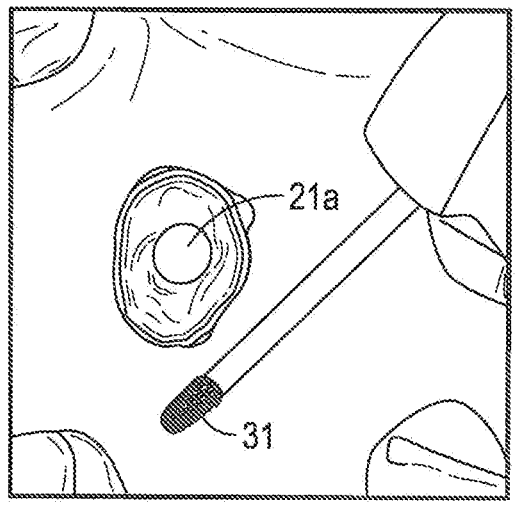
FIG. 9B
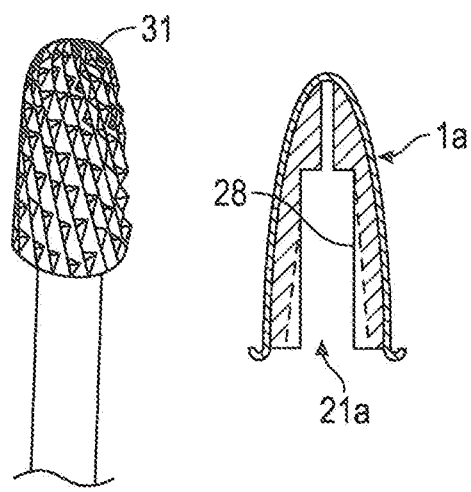
FIG. 9B.1

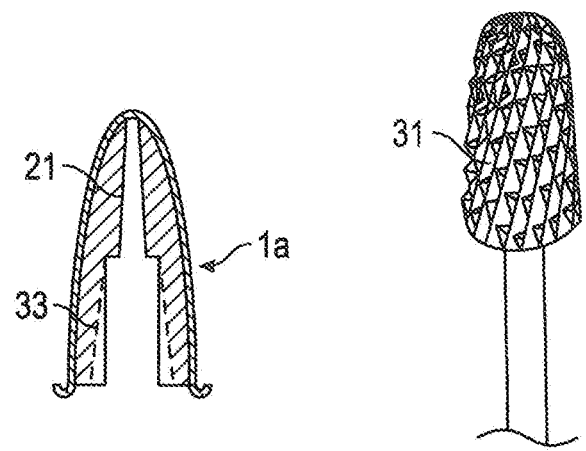
FIG. 10.1
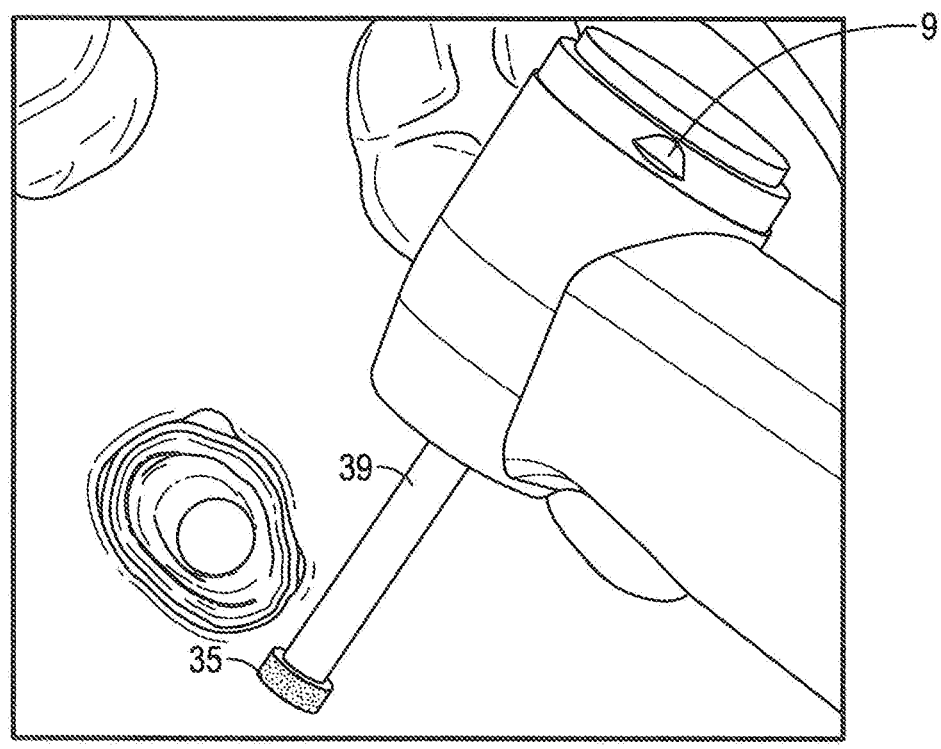
FIG. 11A

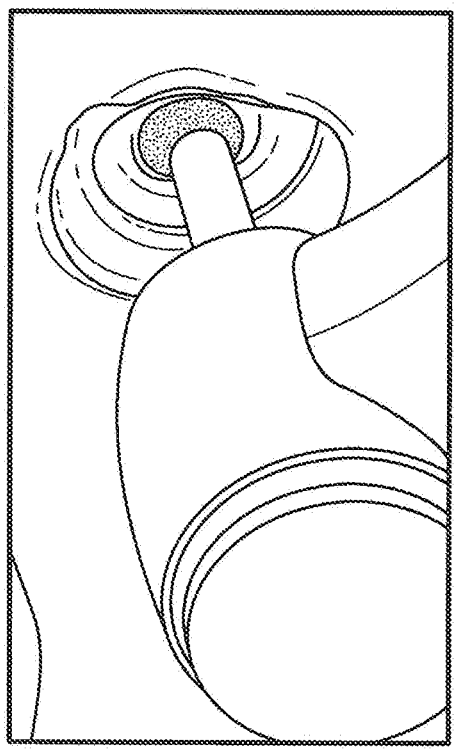
FIG. 11B
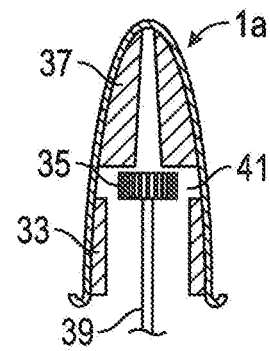
FIG. 11B.1
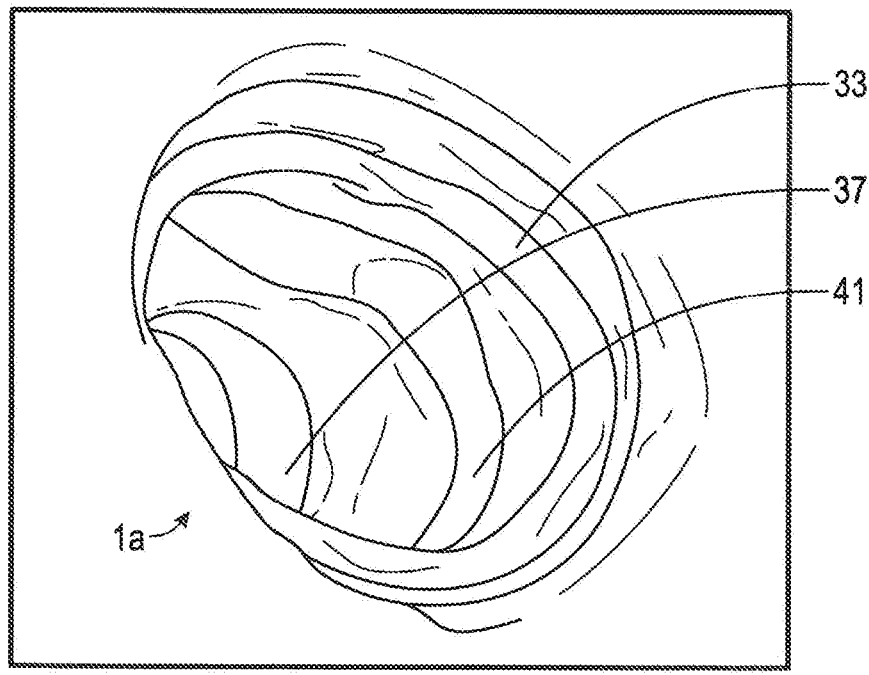
FIG. 11C

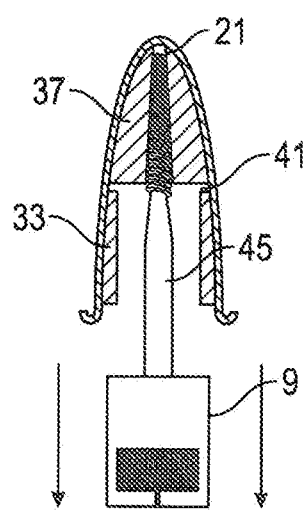
FIG. 13A.1

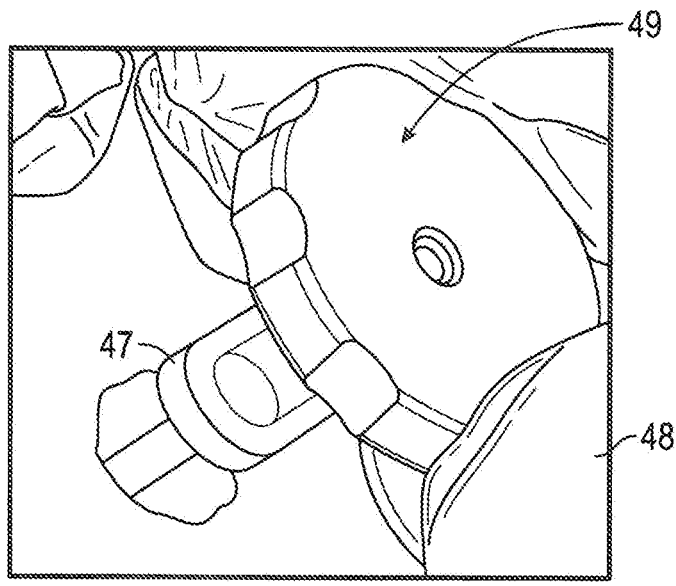
FIG. 14B
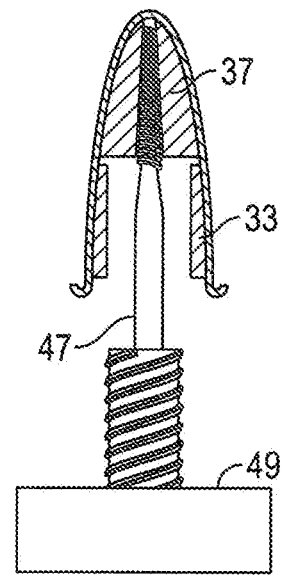
FIG. 14B.1
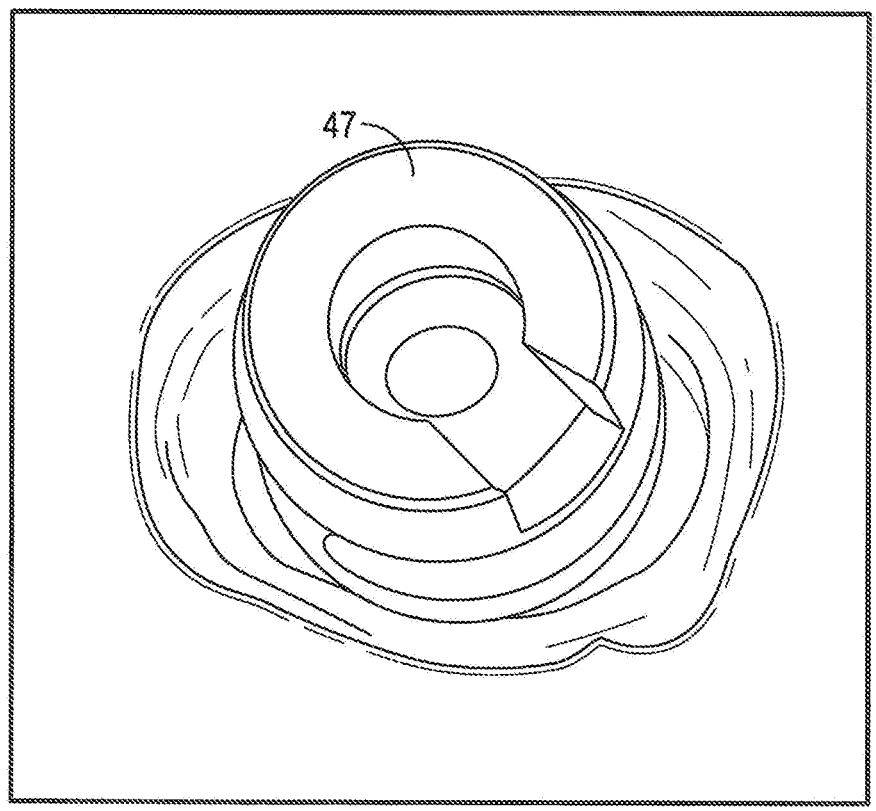
FIG. 14C

FIG. 15B.1

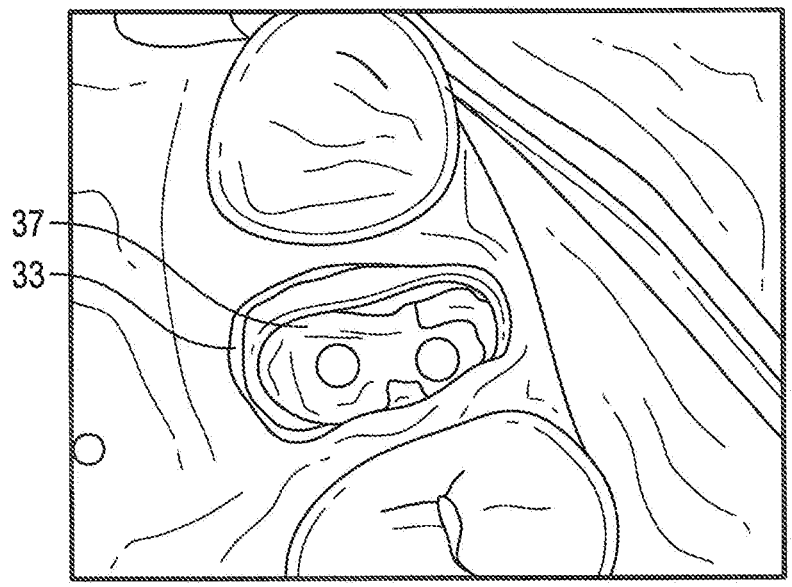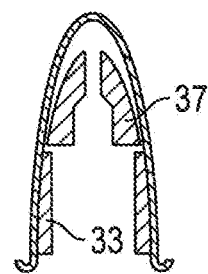
FIG. 16   FIG. 16.1
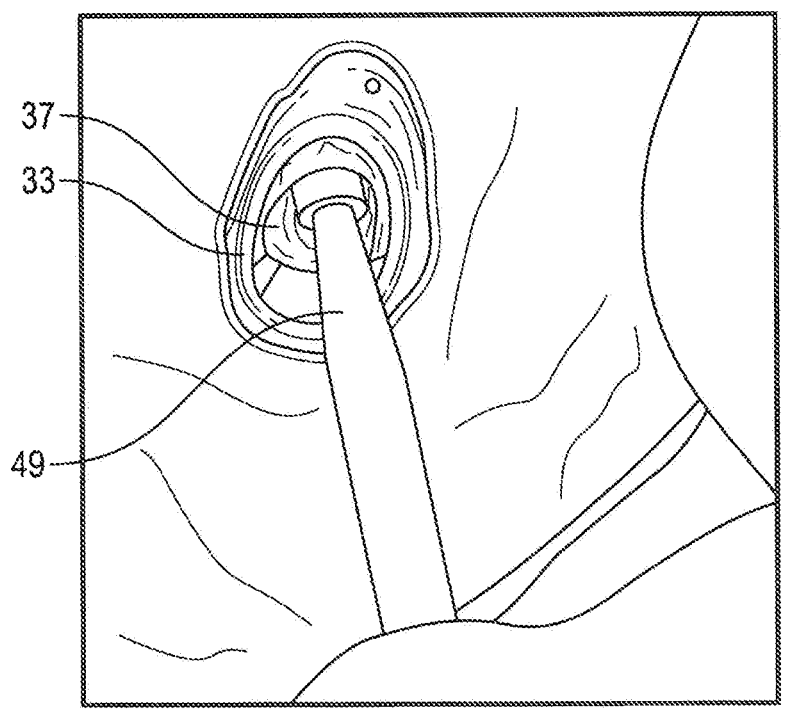
FIG. 17A

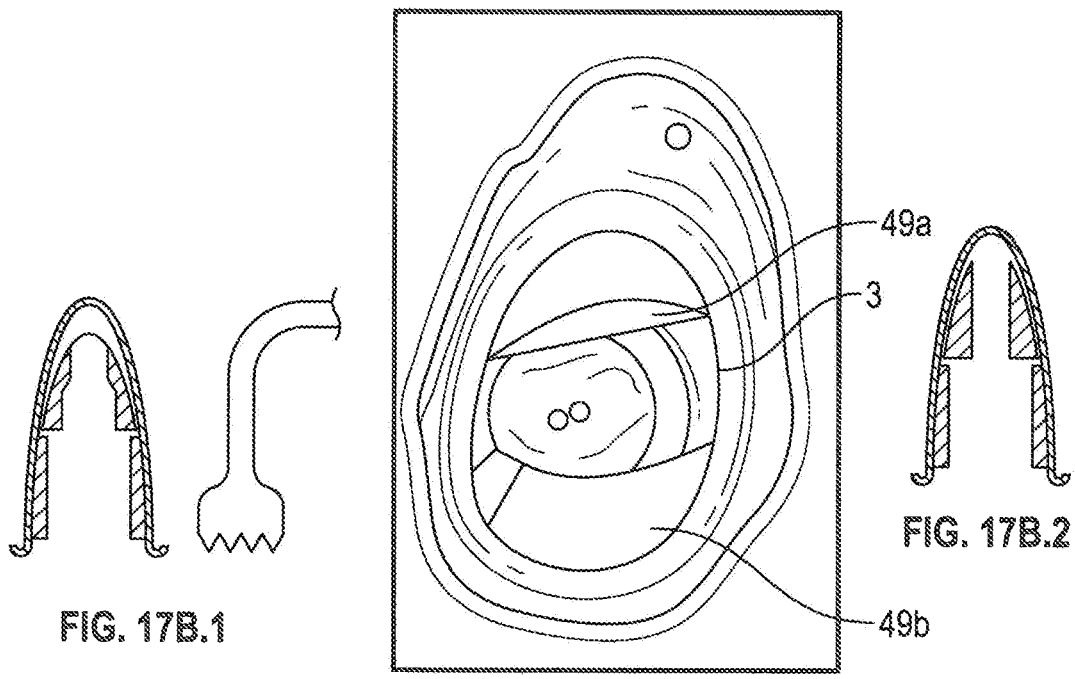
FIG. 17B.1    FIG. 17B    FIG. 17B.2
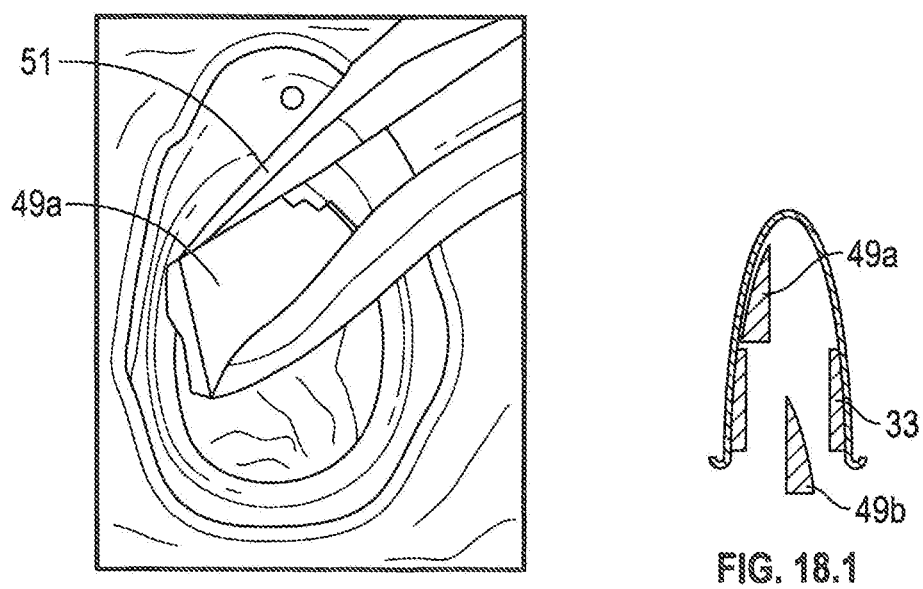
FIG. 18    FIG. 18.1

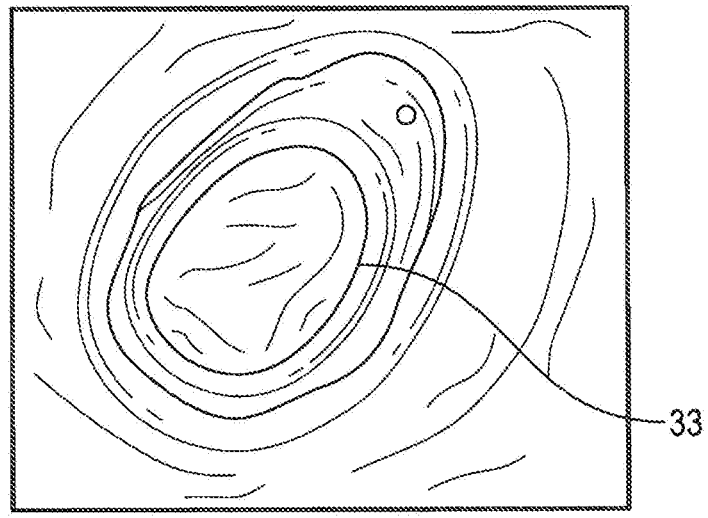
FIG. 19
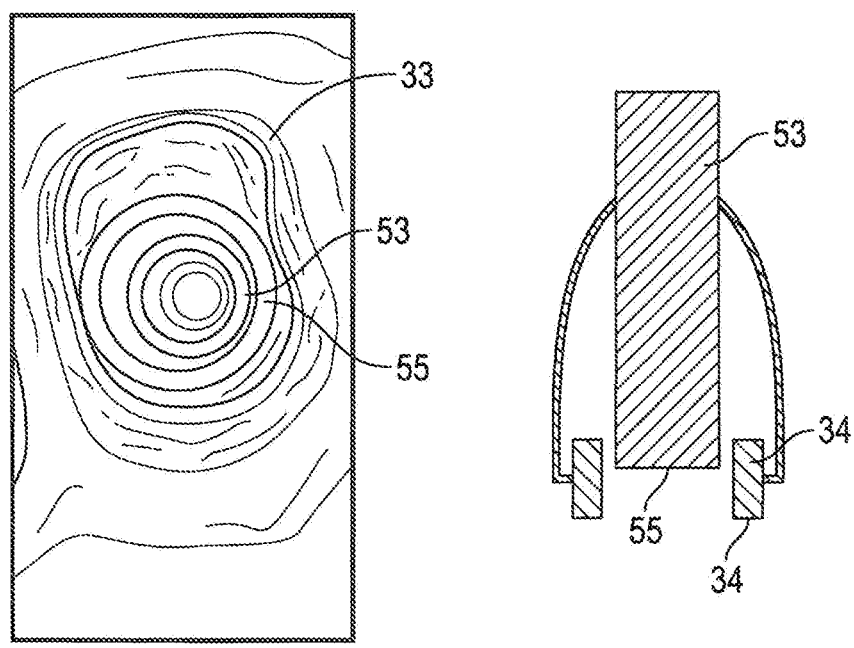
FIG. 20　　　　　FIG. 20.1

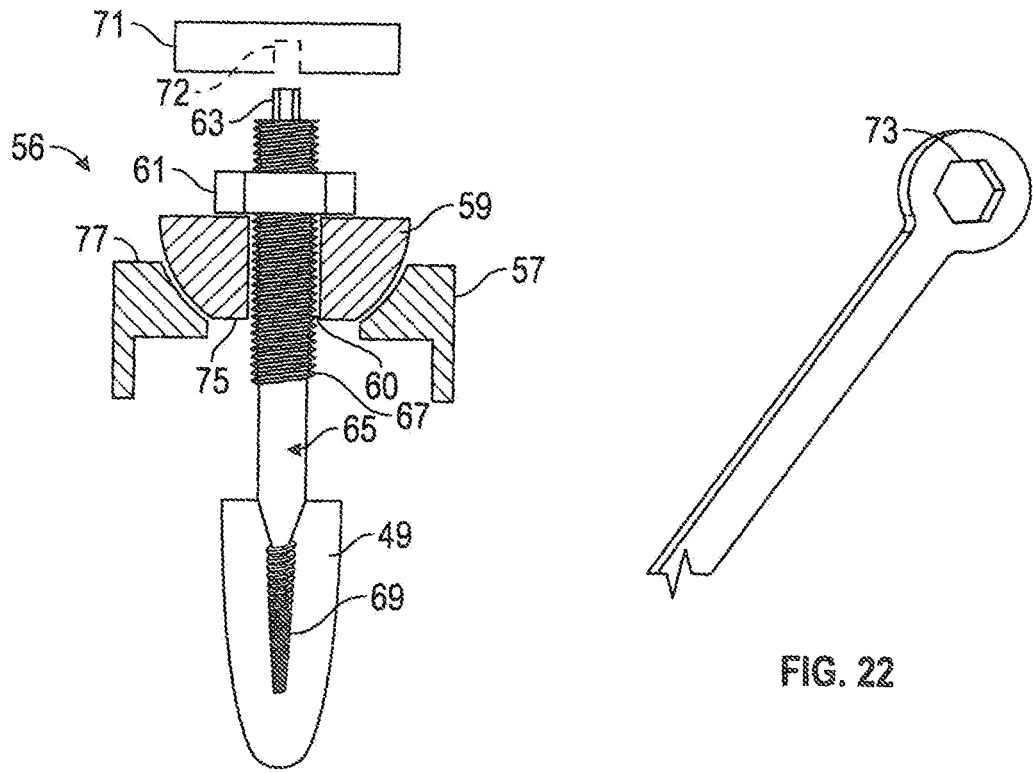
FIG. 21
FIG. 22
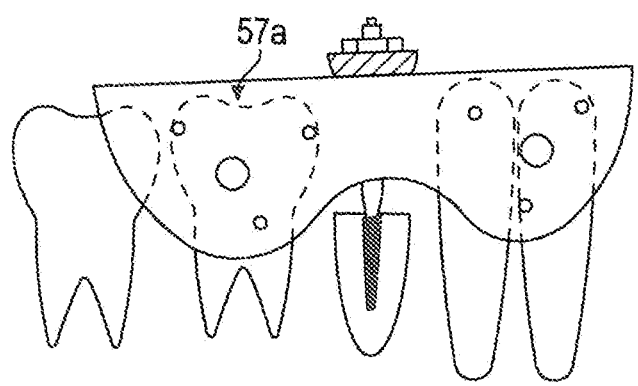
FIG. 23

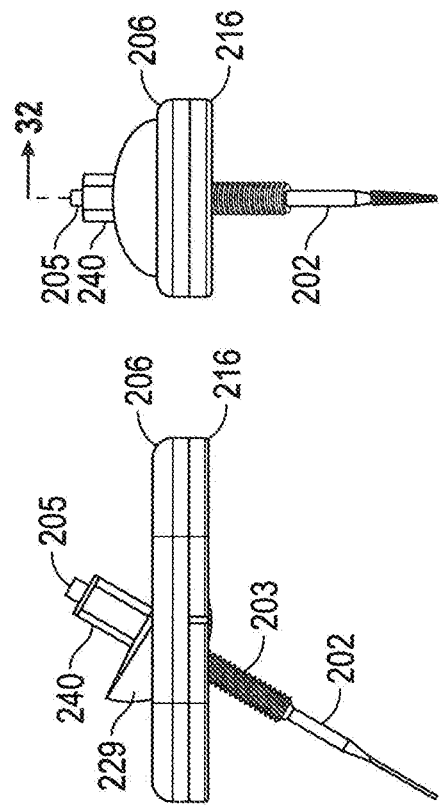
FIG. 29
FIG. 30
FIG. 31
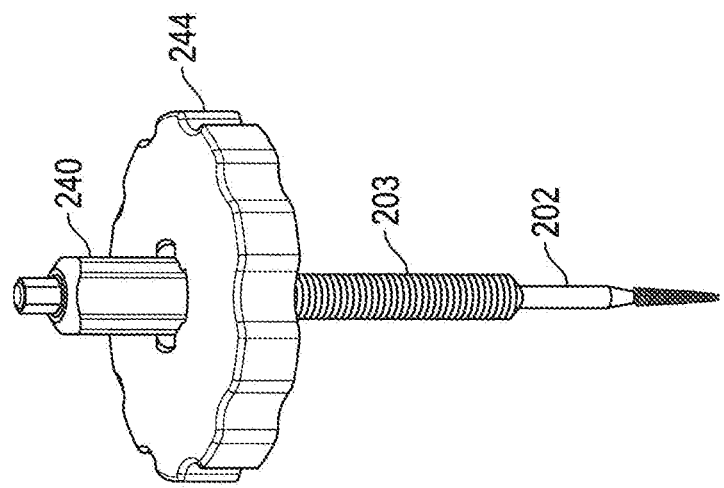
FIG. 28

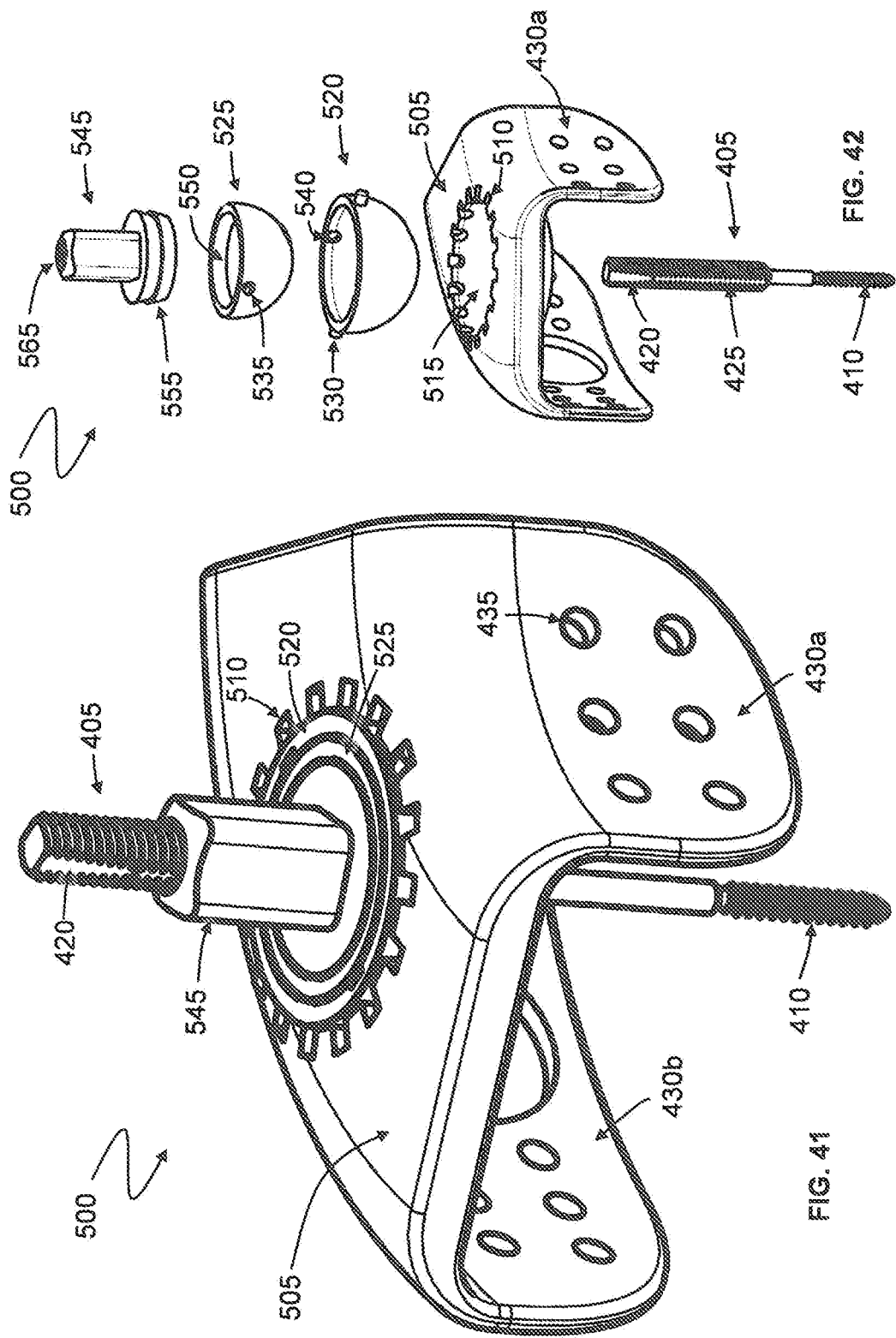

DENTAL SURGERY METHOD AND DEVICE

RELATED APPLICATIONS

This application is a continuation-in-part of International Application No. PCT/AU2019/050112 filed 13 Feb. 2019, which claims the benefit of Australian Application No. 2018201058 filed on 13 Feb. 2020, and Australian Application No. 2018901687 filed on 15 May 2018, and is also a continuation-in-part of Australian Application No. 2020201283 filed 21 Feb. 2020, the entirety of all of which are incorporated herein by reference.

TECHNICAL FIELD

The present invention concerns a dental surgery method, and to instruments for use in dental surgery.

BACKGROUND ART

Any references to methods, apparatus or documents of the prior art are not to be taken as constituting any evidence or admission that they formed, or form part of the common general knowledge.

Tooth extraction is associated with dimensional changes of the alveolar ridge. Bone resorption can occur in both a horizontal and vertical direction. These resorptive changes can continue for the life of the patient.

Fixed crown and bridgework is often the treatment modality of choice for replacement of missing teeth. Crowns can be supported from implants inserted into the actual tooth socket following tooth extraction. Alternatively, bridges can be used whereby the crown used to replace the missing tooth or teeth is suspended from an adjacent natural tooth or an adjacent dental implant. This is called a "pontic" crown.

Removable dentures can also be used to replace a missing tooth or teeth. Patients generally prefer a fixed solution to replace missing teeth as it is more similar in function to natural teeth.

Continued resorption of bone and gum around fixed crown and bridgework can severely compromise the aesthetic outcome of dental treatment. As the gum shrinks away from the teeth interproximally, annoying food traps are created. This inevitable atrophy following tooth loss can be particularly destructive under removable dentures. Pain can occur as the denture impinges on a reduced soft tissue base and retention of this prosthesis can be diminished with time.

This resorption of hard and soft tissues is inevitable after tooth extraction using current extraction techniques. Over the years a number of different approaches have been undertaken to address this problem. The gold standard for many years has been the addition of de-proteinized bovine bone to or adjacent to the tooth socket to offset this resorptive process. Connective Tissue Grafts have also been used extensively to increase the gum thickness to disguise this atrophy.

A newer technique to combat this problem is the "Socket Shield" technique. The socket shield technique involves leaving a buccal root segment that remains in place to avoid resorption of buccal bone and gum. A dental implant is placed behind the buccal root and is used to affix a dental crown.

A variant of this technique known as the "Pontic Shield" technique can be used to preserve the alveolar ridge under a dental bridge. A pontic crown is suspended over the extraction socket with a retained portion of the buccal root.

The present inventor believes that the Socket Shield technique is difficult for the dentist to perform and traumatic for the patient since it typically involves cutting the tooth into sectors and then drilling and levering sectors behind the buccal root segment from the bone. Such operations are time consuming and may be traumatic for the patient; often there is inadvertent damage to the site for the implantation and to the surrounding gum tissue. Mobility of the shield can also result when the sectors are removed causing the procedure to be abandoned. Only the buccal bone is supported by the tooth root and not the palatal bone. This may lead to a future atrophy of the palatal bone and gum. Furthermore, depending on the tooth involved, it is difficult for the dental surgeon to ascertain the desired geometry for the buccal root segment. Infection can develop if this geometry is incorrect and the shield extends to close the root apex. Whilst the Socket Shield technique can be performed on front teeth, it is more difficult to perform on teeth toward the back of the jaw because of limited access and complicated root morphology.

Migration and or exposure of the shield can also occur during the provisional stage of treatment as the shield is not secured to the implant itself.

Furthermore, a problem with tooth root extraction devices that may be used in such procedures is that when used forces may be applied to the screw in undesirable directions, which can cause the screw to bend or break, or cause the tooth root to break, which is clearly undesirable.

It is an objective of the present invention to provide a method and apparatus that addresses one or more of the above problems.

SUMMARY OF THE INVENTION

According to a first aspect of the present invention there is provided a device for detaching a tooth root comprising:

a lead screw having a threaded point for screwing into the tooth root, and a threaded shaft;

a pivoting member including a bore through which the lead screw passes, the lead screw being retractable through the bore by rotational engagement of a threaded member with the threaded shaft of the lead screw; and a platform for supporting the pivoting member such that the lead screw is able to pivot relative to the platform, wherein the lead screw includes a locking surface for preventing rotation of the lead screw during rotational engagement of the threaded member with the threaded shaft.

In one embodiment, the threaded member comprises at least part of the pivoting member, such that rotation of the at least part of the pivoting member relative to the lead screw causes the lead screw to retract through the bore.

In one embodiment, the locking surface comprises a locking surface at an end of the lead screw. The locking surface may comprise opposing planar surfaces of a shaft of the lead screw. The locking surface may comprise a coupling protrusion.

The locking surface may be configured to be received in, and engage with a locking tool.

The locking surface may be used to screw the lead screw into the tooth root. Alternatively, the lead screw may include one or more other engagement surfaces to be used to screw the lead screw into the tooth root. The lead screw may then be retracted in order to detach or remove the tooth root.

In one embodiment, the threaded shaft of the lead screw engages with a threaded portion in the bore of the pivoting arrangement, such that rotation of the bore relative to the lead screw causes the lead screw to retract through the bore.

In another embodiment, the locking surface of the lead screw comprises a planar face on a side of the threaded shaft. The planar face may comprise a face of a pair of opposing faces. The planar face may extend substantially along a length of the threaded shaft.

The planar face may be configured to engage with an aperture of the pivoting member, to prevent rotation of the lead screw. This may be achieved by preventing rotation of the lead screw relative to the pivoting member. At least part of the pivoting member may be rotationally locked to the platform.

The device may be configured such that it may be at least partially assembled subsequent to screwing the lead screw into the tooth root.

In one embodiment, the platform has a curved recess, the curved recess having an opening in the lower part thereof, the lead screw passing through the opening in the curved recess. The pivoting member may comprise a curved region of complementary shape to the curved recess in the platform, the curved region of the pivoting member being received in the curved recess of the platform. When the lead screw is positioned through the pivoting member, the lead screw may also pivot relative to the platform.

The curved region of the pivoting member may comprise a hemispherical region.

The pivoting member may comprise a ratcheting nut, the ratcheting nut having an outer body and a threaded insert for engaging with threads of the lead screw, the outer body and a threaded insert coupled such that rotation of the outer body in one direction causes rotation of the lead screw and rotation of the other direction does not cause rotation of the lead screw.

The pivoting member may include a gimbal portion having first and second supports, the gimbal portion pivotable around an axis of the first and second supports.

The pivoting member may include first and second gimbal portions, the first and second gimbal portions rotatable around orthogonal axes.

The platform may include grooved channels, in which supports of the gimbal portion are received. The grooved channels may enable the gimbal portion to pivot around an axis perpendicular an axis of the supports. In such case, the supports may travel lengthwise along the channels.

The grooved channels may be configured prevent rotation of the gimbal around the curved recess when in use.

A plurality of grooved channels may be positioned around a periphery of the curved recess, enabling rotation of the gimbal portion by positioning the supports in one or more of the grooved channels.

In an alternative embodiment, the platform may include retaining apertures, in which supports of the gimbal portion are received. The retaining apertures may be configured to prevent rotation of the gimbal around the curved recess.

A plurality of retaining apertures may be positioned around a periphery of the curved recess, enabling rotation of the gimbal portion by positioning the supports in a pair of the retaining apertures.

The pivoting member may include a first portion, which is locked, and a second portion, which may rotate. The first portion which is locked may be locked to prevent the screw from being rotated.

In one embodiment, the platform is provided with a cushion. The cushion may rest on the patient's teeth during the procedure. The cushion may comprise a silicone material or a rubber material or hard plastic. The cushion may be releasably attached to the platform. The cushion may comprise a disposable article. Cushions of different height can be used to level the platform. Larger cushions can be used where adjacent teeth are missing.

The platform is suitably made of a rigid material. The platform may be made from metal, such as a surgical grade metal or a surgical grade stainless steel, or from a rigid plastic material. The platform may comprise a single use platform or it may be a re-usable platform. It will be appreciated that if the platform is re-usable, it will need to be sterilised after each procedure.

The pivoting member may comprise a unitary member having the bore passing therethrough. In other embodiments, the pivoting member may be made from two or more components that are joined together. The pivoting member may be made from metal, such as a surgical grade metal or a surgical grade stainless steel, or from a rigid plastic material. The pivoting member may comprise a single use pivoting member, or it may be a re-usable pivoting member. It will be appreciated that if the pivoting member is re-usable, it will need to be sterilised after each procedure.

In another embodiment, the bore through the pivoting member need not have a threaded region. In this embodiment, the lead screw may simply be inserted through the bore and then rotation of the lead screw when it comes into contact with the tooth root causes the threaded point of the lead screw to screw into the tooth root. When the threaded point has been attached to the tooth root to the satisfaction of the surgeon, the lead screw may be pulled away from the gum of the patient, to thereby detach or remove the tooth root from the gum by rotational engagement of a threaded member.

According to a further aspect of the present invention there is provided a root detachment screw including:

a threaded point, for screwing into a tooth root;

a threaded shaft extending upwardly from the threaded tip, the threaded shaft engageable with a threaded member to enable extraction of the screw by rotation of the threaded member relative to the threaded shaft; and a locking surface, configured to enable rotation of the screw to be prevented while rotating the threaded member relative to the threaded shaft.

The shaft may have a greater diameter than the threaded point. The shaft may be substantially uniform in diameter.

The locking surface may comprise planar sides of the threaded shaft. The planar sides may extend along a substantial length of the shaft.

According to yet a further aspect of the present invention there is provided a tooth root detachment instrument comprising:

a lead screw including a screw portion about which an operative member, for example a nut, is threaded for translating the lead screw and a threaded point for screwing into the tooth root;

a pivoting member having a bore traversed by the lead screw wherein the operative member captures the threaded portion on a coronal side of the pivoting member; and a platform for supporting the pivoting member including an opening for passage of the point therethrough, wherein the lead screw includes a locking surface, configured to enable rotation of the screw to be prevented while rotating the operative member relative to the lead screw.

Preferably the pivoting member includes a hemispherical portion. The pivoting member or hemispherical portion is preferably made from a rigid material.

A coupling formation fast with the lead screw may be provided for applying rotation to the lead screw to thereby screw the point into the tooth root.

In a preferred embodiment of the invention the instrument includes a rotatable handle arranged to mate with the coupling formation whereby rotation of the rotatable handle is transmitted to the lead screw by means of the coupling formation.

In some embodiments, a thrust washer or a thrust bearing may be located between the operative member and the pivoting member such that rotation of the operative member does not cause rotation of the pivoting member.

The platform may be shaped for positioning over one of an anterior, posterior or canine tooth.

According to yet a further aspect of the present invention there is provided a ratchet nut for a medical device, the ratchet nut having an outer body defining a plurality of teeth, and a threaded bore for engaging with threads of a threaded shaft, the outer body adapted to engage with a pawl of a ratchet spanner such that rotation of the ratchet spanner in one direction causes rotation of the ratchet nut and rotation of the other direction does not cause rotation of the ratchet nut.

BRIEF DESCRIPTION OF THE DRAWINGS

Preferred features, embodiments and variations of the invention may be discerned from the following Detailed Description which provides sufficient information for those skilled in the art to perform the invention. The Detailed Description is not to be regarded as limiting the scope of the preceding Summary of the Invention in any way. The Detailed Description will make reference to a number of drawings as follows:

FIGS. 1A, 1A.1 and 1B illustrate cutting into a side of a crown of a tooth, being a first stage in de-coronation of the tooth.

FIGS. 2A, 2B and 2B.1 illustrate the use of a lever to separate the crown from the remainder of the tooth to thereby leave a tooth root.

FIGS. 3A, 3A.1 and 3B illustrate the use of a bur to reduce the root below the gum line.

FIGS. 4 and 4.1 show the use of root canal files to enlarge the root canal.

FIGS. 5A to 5D show the use of progressively larger Gates-Gliddon drills to sequentially enlarge the canal.

FIGS. 6A, 6A.1 and 6B illustrate the use of a first diameter drill bit to further enlarge the coronal portion of the canal.

FIG. 9A to 9D depict a custom-tapered bur and its use in milling-out the tooth root around the canal to leave a tooth ring at the coronal portion of the tooth.

FIGS. 11A to 11C show the use of a "T" shaped bur to sever the tooth root from the tooth ring.

FIGS. 14A to 14C illustrate the insertion of a post into the severed apical tooth root.

FIGS. 16 and 16.1 show a root detached from the bone subsequent to operation of the root extraction device and removal of the post.

FIGS. 17A and 17B illustrate the sectioning of the detached apical root.

FIG. 17B.1 illustrates the end of a piezo saw tool for sectioning the detached root.

FIG. 17B.2 is a sagittal cross-sectional view of the sectioned detached tooth.

FIGS. 18 and 18.1 illustrate the removal of the sectioned root through the lumen of the tooth ring.

FIG. 19 shows the tooth ring left intact subsequent to removal of the sectioned root.

FIGS. 20 and 20.1 show the implant placed through the tooth ring and secured to the underlying bone.

FIG. 21 depicts a root extraction instrument according to a preferred embodiment of an aspect of the present invention.

FIG. 22 depicts a wrench for operating an operative member in the form of a nut of the root extraction instrument of FIG. 21.

FIG. 23 depicts a platform or "tray" of a root extraction instrument according to a further embodiment of the present invention.

FIG. 28 shows a perspective view of the lead screw and nut having a handwheel placed over the nut to enable the nut to be rotated by the surgeon.

FIG. 29 is a top view of the device shown in FIG. 27.

FIG. 30 is a front view of the device shown in FIG. 29.

FIG. 31 is a side view of the device shown in FIG. 30.

FIG. 41 is a perspective view of a device for detaching a tooth root, according to a further embodiment of the present invention.

FIG. 42 is an exploded view of the device of FIG. 41.

DETAILED DESCRIPTION OF PREFERRED EMBODIMENTS

Figure 5B:
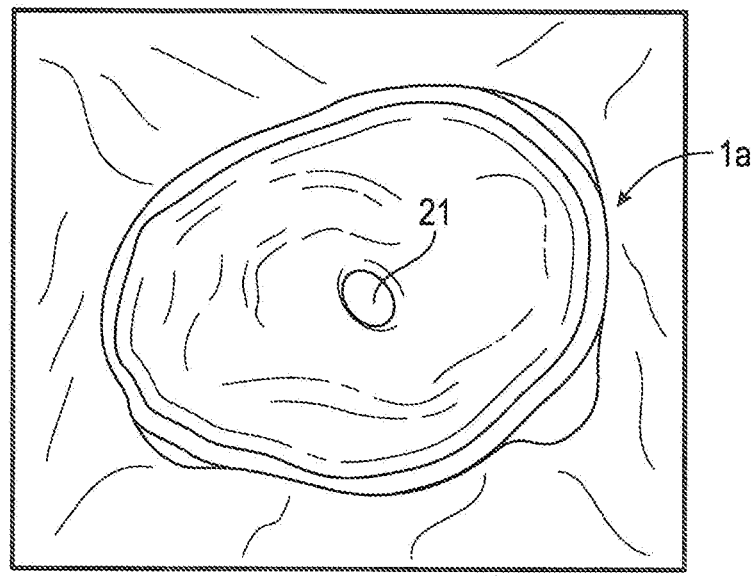
Figure 5C:
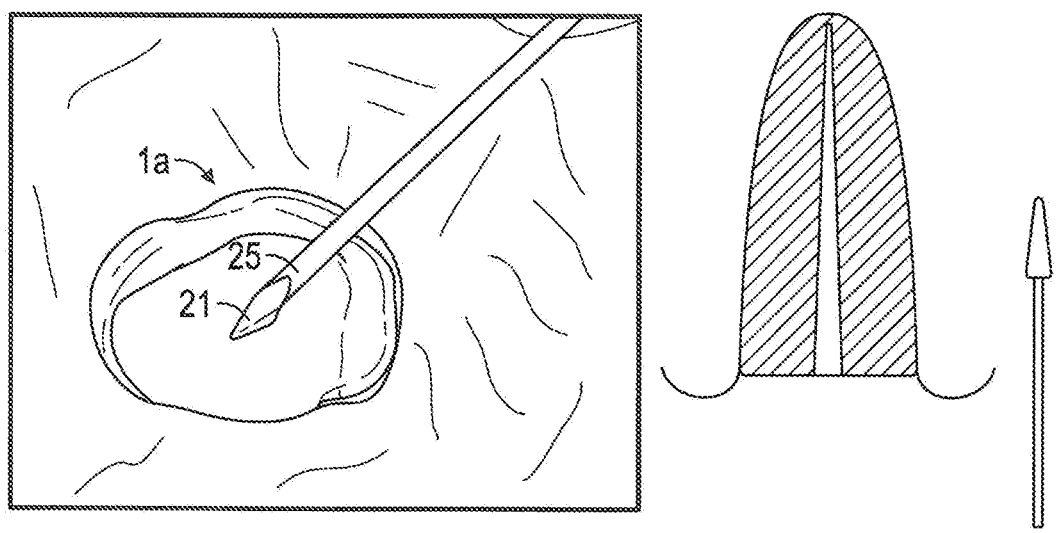

A method for fixing a dental implant according to a preferred embodiment of the present invention will now be described. Initially, as illustrated in FIGS. 1A, 1A.1 and 1B, a side of the crown 3 of the tooth 1 is cut away or removed to form a recess 5 by means of a bur 7, such as a round bur or long-tapered bur driven by a high-torque, water-cooled, high-speed handpiece 9. The bur is used to cut the recess 5 into part of the outer periphery of the tooth, a little above the gum line.

With reference to FIGS. 2A, 2B, 2B.1 a crowbar 11, such as a Luxator or similar instrument, is used to snap the crown 3 from the tooth 1 to thereby leave a de-coronated tooth 1a (as shown in FIG. 3A).

Referring now to FIGS. 3A, 3A.1 and 3B, a large round diamond bur 13 is fitted to handpiece 9 and is then used to reduce the root 15 of the de-coronated root 1a to about 2 mm below the gum line 17, or further in the case of periodontal disease.

As illustrated in FIGS. 4 and 4.1, a conventional root canal file 19 is then used to access the root canal system 21 of the tooth root 1a. Canal(s) can then be enlarged. Penetration control, by means of a stop 23, is suggested for abnormally short teeth or those in close proximity to the Inferior Alveolar Nerve in the mandible.

Referring now to FIGS. 5A-5D, Gates-Gliddon drills 25 can then be used sequentially to enlarge the canal(s) 21 further. Sizes 1, 3, 5 are usually sufficient for adequate enlargement.

Figure 7B:
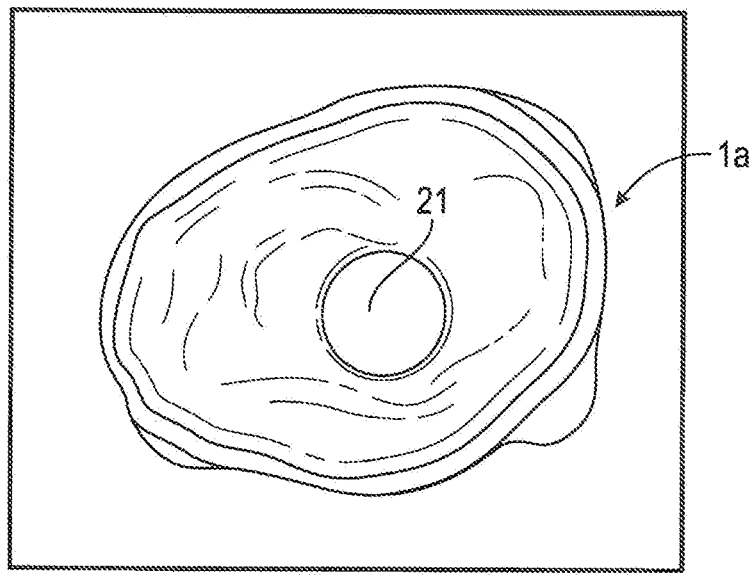
FIGS. 7A, 7A.1 and 7B illustrate the use of a second, larger diameter drill bit to further enlarge the coronal portion of the canal.

A 1.5 mm diameter drill bit 27 is next used to further enlarge the coronal portion of the canal to a depth of 7 mm as shown in FIGS. 6A and 6B. A 2 mm diameter drill bit 27 is then used to further enlarge the coronal portion of the canal to the depth of 7 mm as shown in FIGS. 7A and 7B.

Figure 8A:
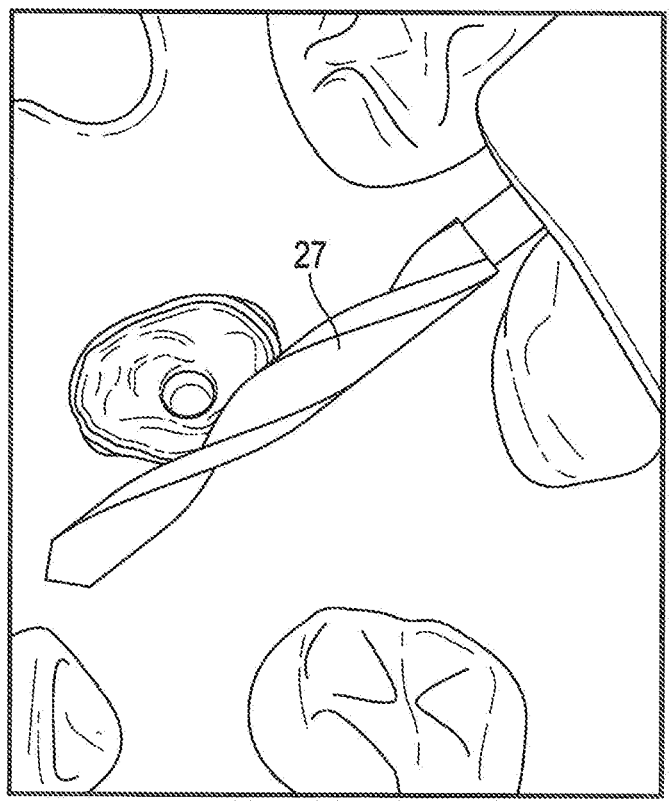
FIGS. 8A to 8C.1 illustrate the use of progressively larger diameter drill bits to further enlarge the coronal portion of the canal.
Figure 8B:
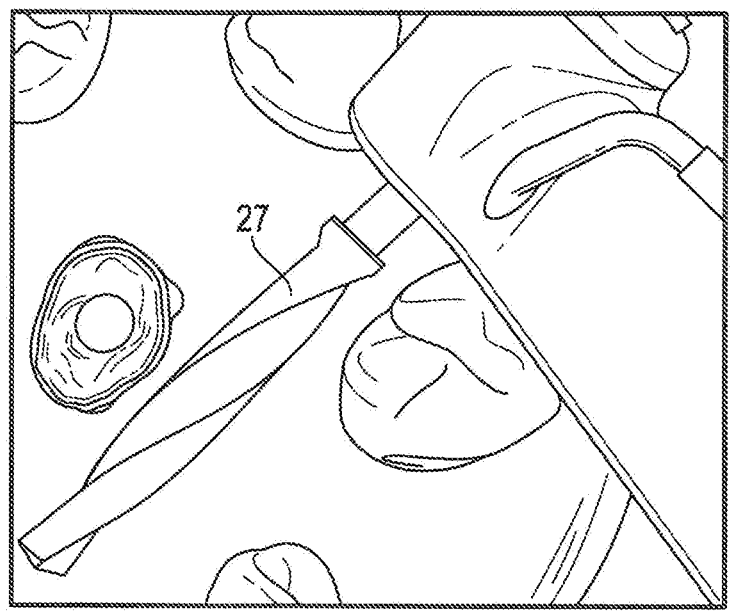
Figure 8C:
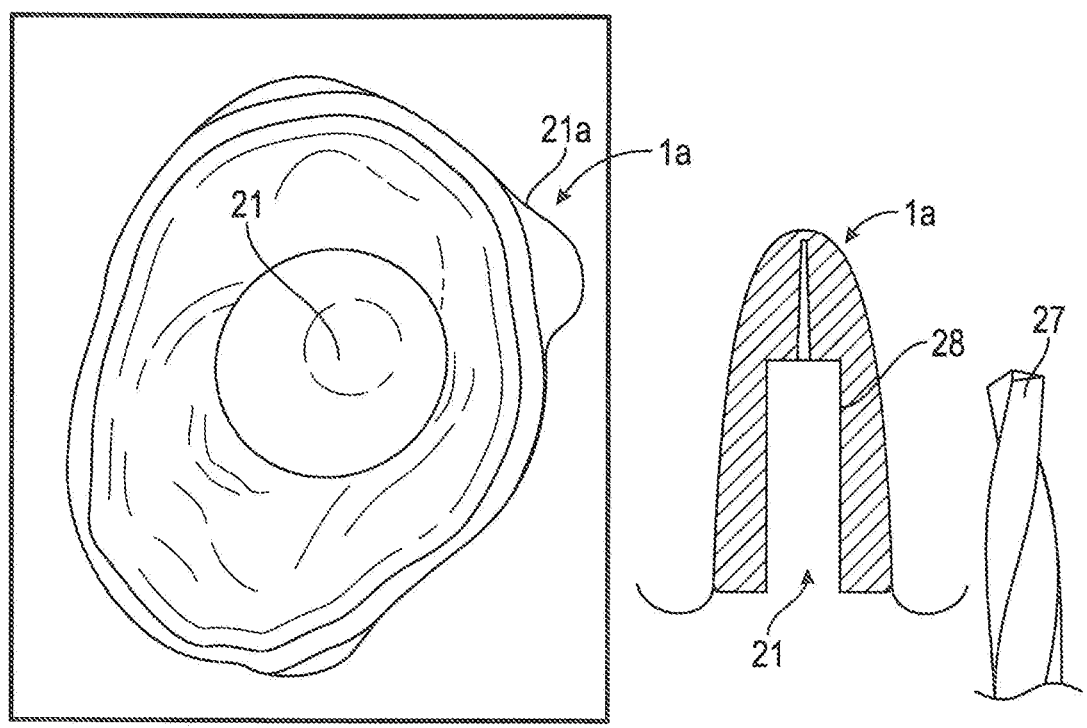
Figure 9C:
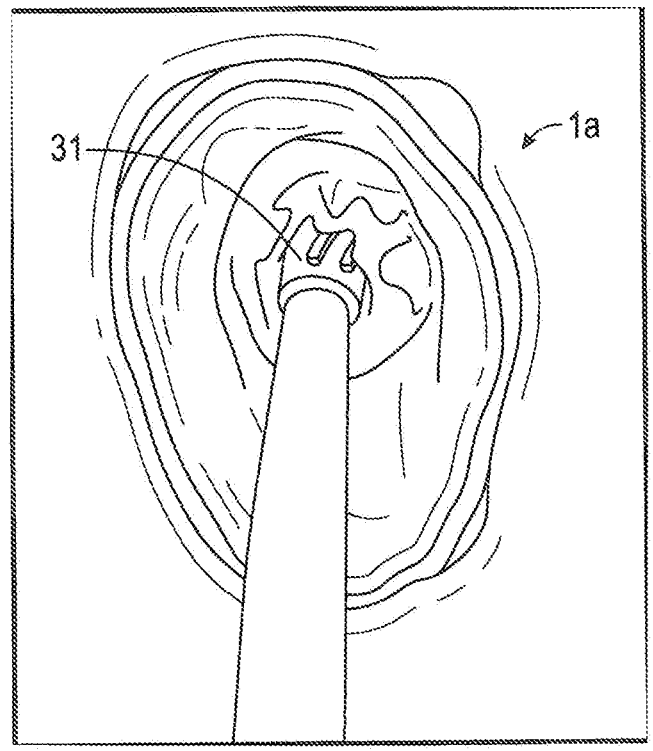
Figure 9D:
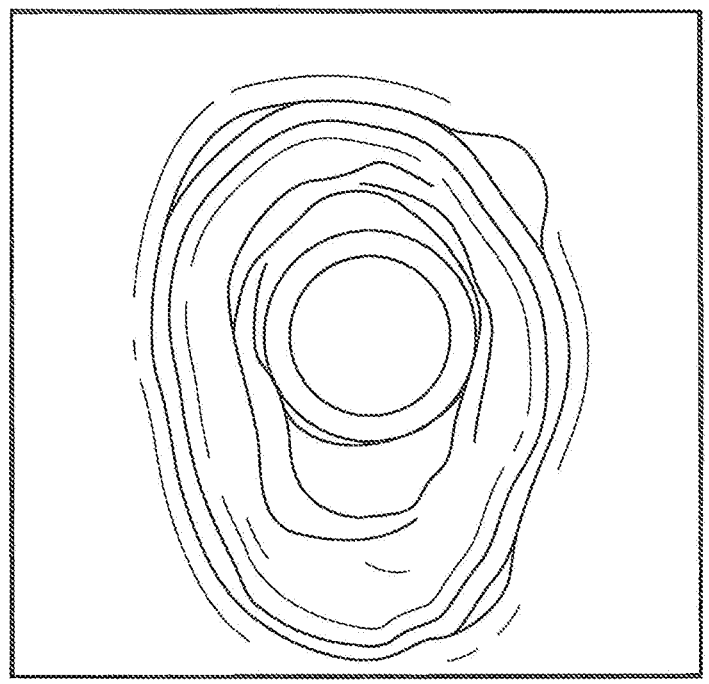

As illustrated in FIGS. 8A to 8C.1, sequentially larger drill bits 27 are then used to successively enlarge the coronal 7 mm portion 28 of the canal 21 until minimum thickness of the tooth ring approaches 0.5 mm to 1 mm. At this stage, a generally circular hole 21A has been formed in the coronal portion of the tooth root. However, there remains a significant amount of tooth material left between the generally circular hole 21A and the outer periphery of the tooth. The next steps in the method of this embodiment of the present invention involve removing a significant proportion of that tooth material between the generally circular hole 21A and the periphery of the tooth such that a ring of tooth (or a tooth ring) is left, with the tooth ring having a largely uniform wall thickness around its periphery.

With reference to FIGS. 9A to 9D, a custom tapered bur with a flat non-cutting base 31 is applied at high torque and high speed (max 80,000 RPM) to continue enlargement of coronal portion 28 of the canal 21. The shape of the preparation should follow the anatomical outline of the de-coronated tooth 1a. Water-cooling is not essential at this point providing no perforations are made. The depth of this flaring vertically is performed to a depth of 7 mm. For multi-rooted teeth, de-coring of the entire pulpal chamber using a tapered bur is the first step. The pulpal floor is removed in its entirety and the roots are then severed at or slightly below the furcation level using the custom "T" bur. This level is calculated so that 4 mm+1 mm of the tooth ring is preserved above the cut made by the "T" bur. Care must be taken not to perforate the shield on multi-rooted teeth by careful observation of the root morphology. The tooth ring that connects the tooth roots is where most perforations occur. For periodontally-affected molars, the bone may be apical to the furcation area. In this case, the roots can be prepared separately as with single-rooted anterior teeth.

Figure 10:
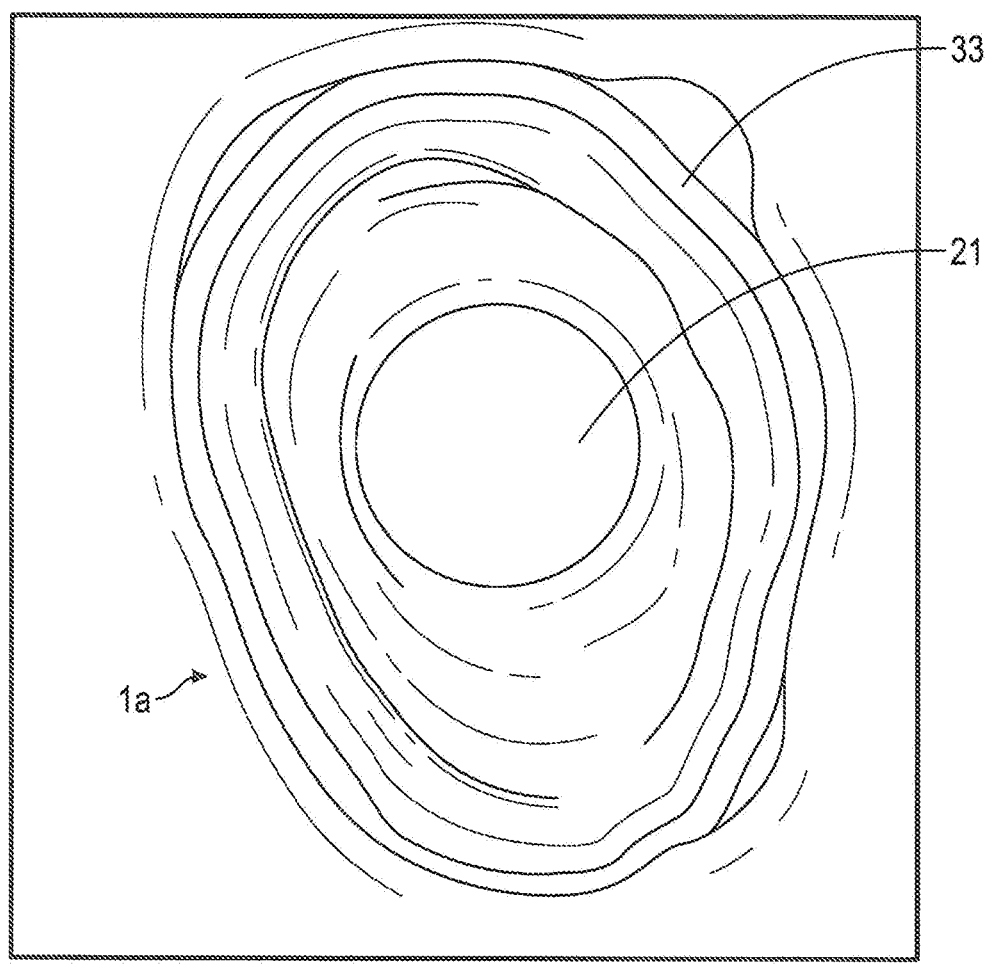
FIGS. 10 and 10.1 show plan and sagittal cross sectional views of the tooth ring.

As illustrated in FIG. 10 at the end of the application of the bur 31 a ring of tooth, i.e. tooth ring 33, is formed that will ultimately act as a shield to prevent resorption of bone. The wall thickness of the tooth ring 33 is roughly 0.5 mm to 1.0 mm in width. The tooth ring may have a height or depth that is around 4±1 mm, although variations from this measurement are possible. Essentially, the tooth ring 33 remains in the tooth socket and provides a surface of natural tooth material remaining in the gum that reinforces and strengthens the tooth socket.

With reference to FIGS. 11A to 11C, using a long-shank, slow-speed custom "T" bur 35 in the water-cooled surgical handpiece 9, the apical portion of the root 37 is severed from the tooth ring 33. This is performed by positioning the "T" bur 35 at the base of the 7 mm deep coronal flaring, i.e. at the base of the lumen of the tooth ring 33 and by moving the bur into contact with and around the periphery of the internal wall of the tooth root to make a cut 41 through the internal wall of the tooth root 1a. The cut 41 defines a gap between the lower part of the tooth ring 33 and the upper part of the apical portion of the tooth root 37. The shank 39 needs to be kept hard against the walls to ensure maximum depth of cutting. The bur 35 may be 3 mm in diameter and 2.5 mm in height and is suitably configured for edge and top cutting only. The generally flat base of the opening in the coronal portion of the tooth root can be used as a guide for the base of the bur when cutting the peripheral opening.

Figure 12A:
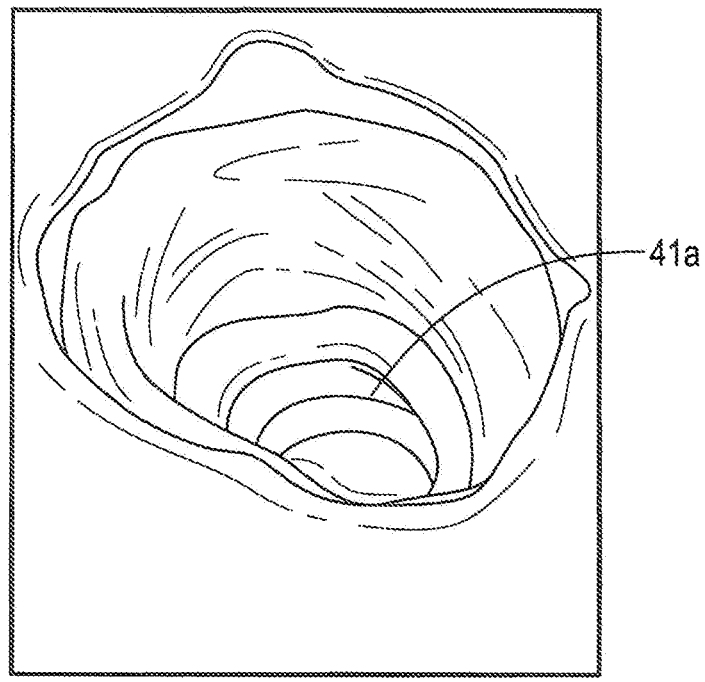
FIGS. 12A, 12B and 12C show a situation in which the "T" shaped bur has not cut through all the way around the periphery of the tooth ring.
Figure 12B:
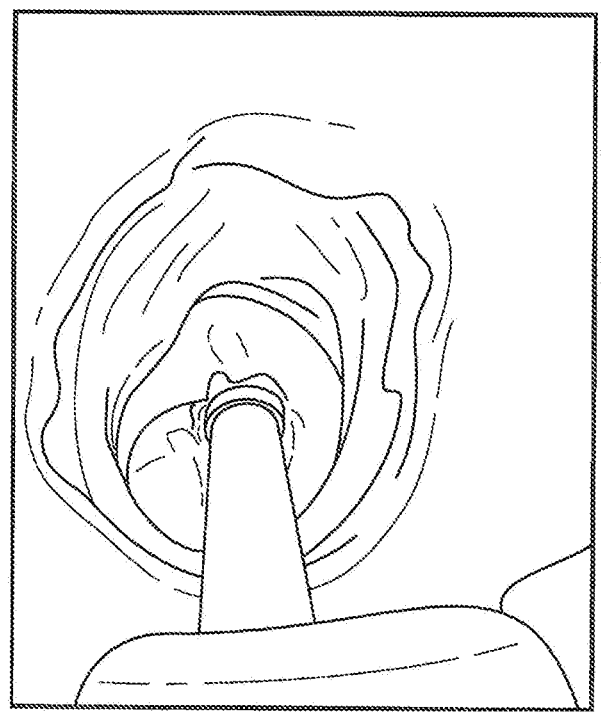
Figure 12C:
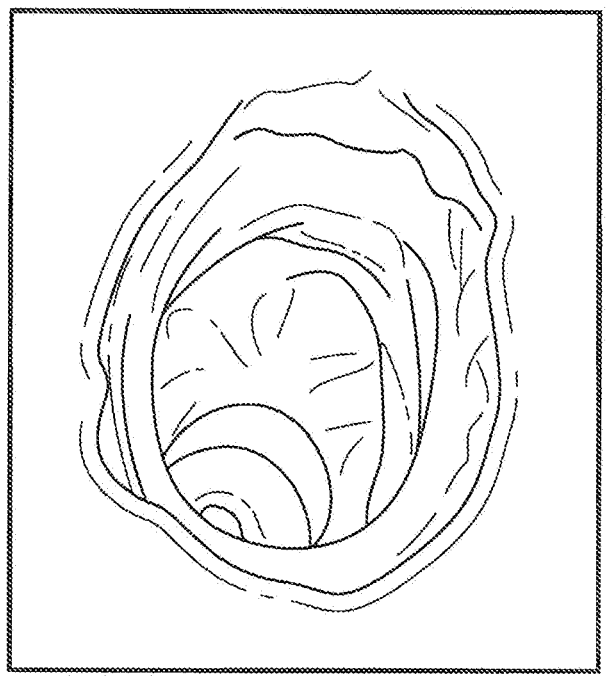

If the custom "T" bur does not completely sever the root 37, further reduction is required to reduce the thickness of the walls. A clean dissection is characterised by bleeding bone and an obvious difference in colour. In the situation illustrated in FIGS. 12A to 12C, the "trough" 41A from the cut-off bur is clearly visible, however no perforation of the root has occurred. In this situation, the custom "T" bur is dragged coronally up the root to reduce the thickness of the walls (see FIGS. 12B and 12C). Then the custom "T" bur is positioned at the base of 7 mm deep preparation and used in a centric motion to sever the root.

Figure 13A:
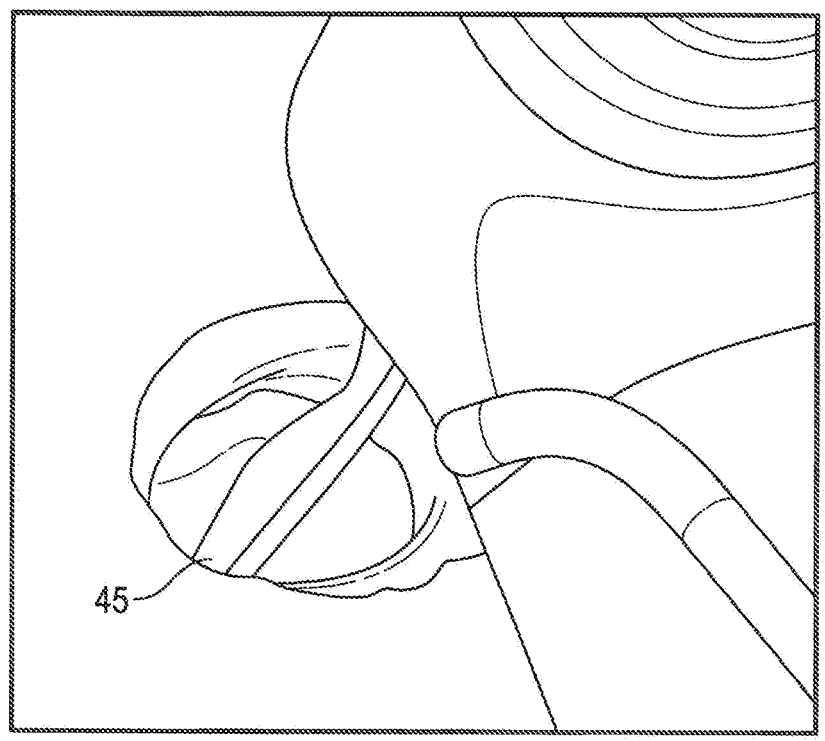
FIGS. 13A and 13B illustrate the drilling of a hole in the severed apical tooth root.
Figure 13B:
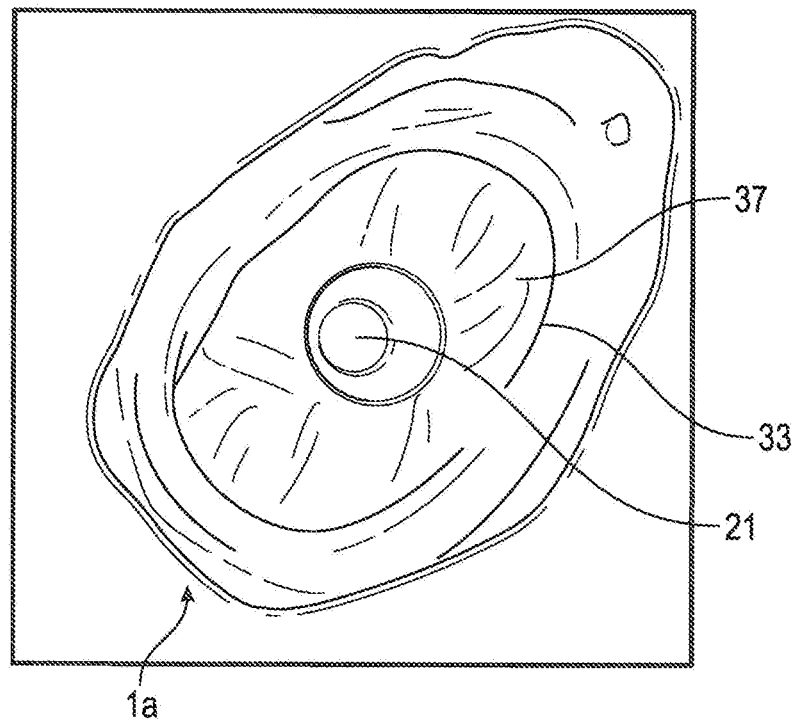

As shown in FIGS. 13A and 13B, a suitable drill bit 45 is then used to drill a hole in the severed root 37 by following the root canal 21. It is preferable to follow the root canal to avoid the risk of perforation. A depth of 5-7 mm is sufficient.

Figure 14A:
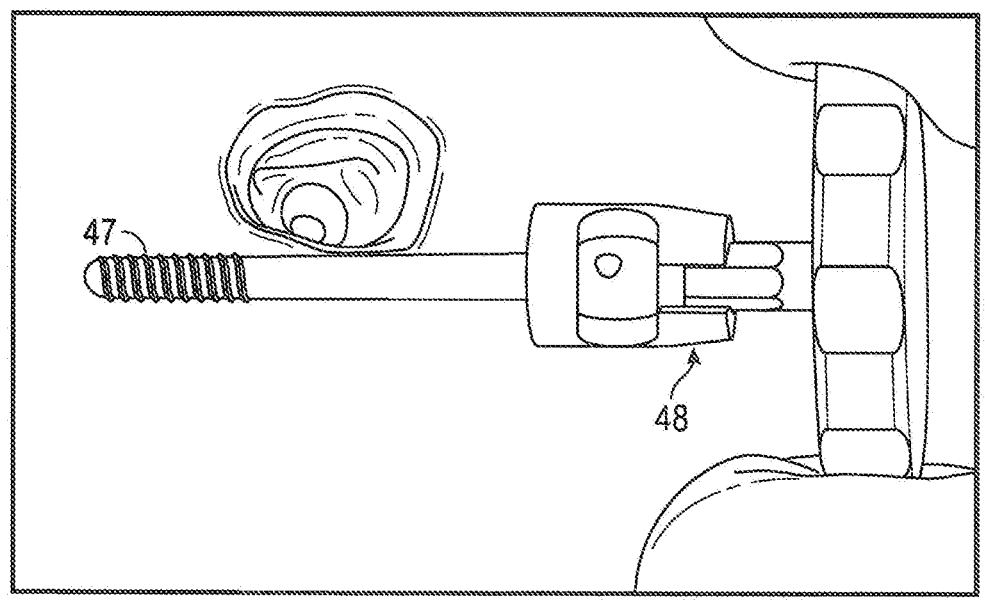

A suitable post 47 is then screwed into the severed root 37 by means of tool 48 as shown in FIGS. 14A-14C.

Figure 15A:
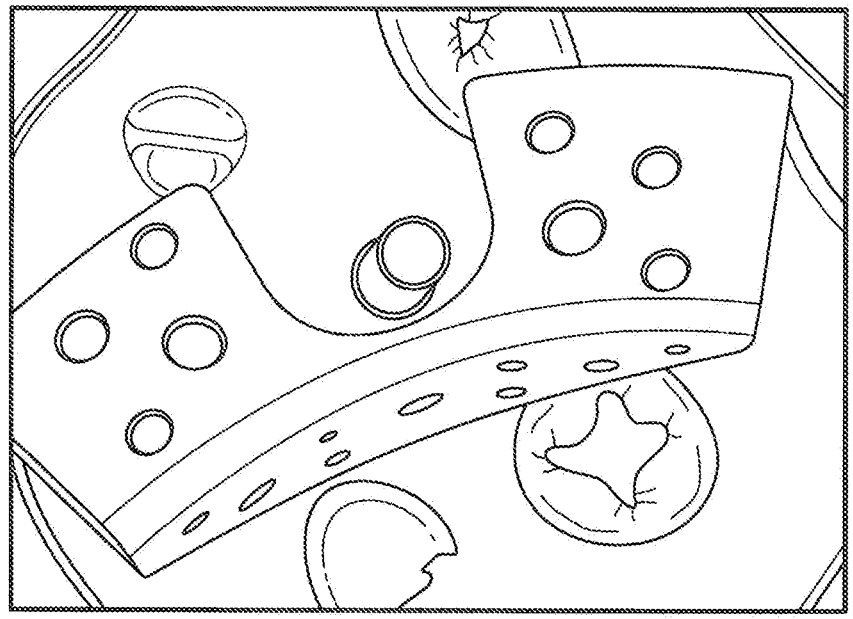
FIGS. 15A to 15B.1 illustrate the fixing of the post to a root extraction device.
Figure 15B:
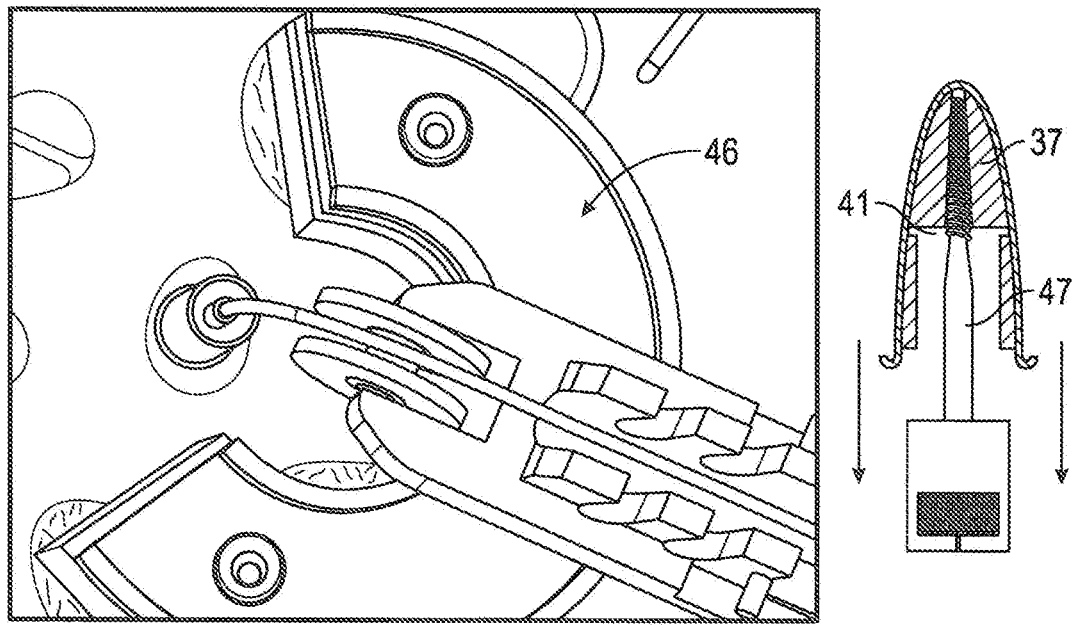

The post 47 is then connected to a Benex or similar root extraction mechanism 46, as illustrated in FIG. 15A (which shows placement of a support tray over the gum), 15B and 15B.1, to thereby extract the apical portion of the root 37 from the underlying bone as shown in FIG. 15B.1.

With reference to FIG. 16, the severed root 37 is then free to move up and down in a vertical motion. The post 47 is then removed by unscrewing it in an anti-clockwise direction. The severed root 37 will usually be too wide to pass through the lumen of the tooth ring 33, except in multi-rooted teeth. Therefore, as illustrated in FIGS. 17A and 17B, a surgical round bur on a high-torque, water-cooled surgical handpiece is then used to section the root into two pieces 49*a*, 49*b*. Alternatively and preferably, a piezo-electric cutting drill such as VS3-LED-HPSC, with a tip as illustrated in FIG. 17B.1, may be used to section the detached root. This is performed at the isthmus. The root pieces 49*a* and 49*b* can then be removed through the lumen of the tooth ring 33 by means of forceps 51 or any other suitable tool as illustrated in FIGS. 18 and 18.1. As a consequence, the tooth ring 33 is left intact and is approximately 4 mm+-1 mm in height and 0.5-1 mm in wall thickness as illustrated in FIG. 19.

In one embodiment of the present invention an implant 53 (if required) is then inserted through the tooth ring 33. The implant may derive stability by contacting the inside wall of the shield. It is preferable that the implant crest 55 extends at or slightly below the base 34 of the tooth ring 33 so that unobstructed access to the internal surface of the implant 53 is preserved. FIGS. 20 and 20.1 show a clinical view of an implant within a tooth ring.

Although the Benex cable and pulley root extraction mechanism that has been described has been found satisfactory with anterior teeth, the Inventor has found that a smaller device, which can be more readily manoeuvred in relation to the back teeth, would be preferable.

Referring now to FIG. 21 there is depicted a root withdrawal apparatus 56 according to an embodiment of an aspect of the present invention. Apparatus 56 includes a platform in the form of a tray 57 that locates over the gum and which has a central opening 75 with arcuate sides 77 that supports a corresponding hemispherical swivel 59 having a central bore 60 formed therethrough.

A lead screw 65 is provided having a threaded portion 67 that passes through the central bore 60 and which is captured by an operative member in the form of a nut 61. The threaded portion 67 terminates in a hexagonal coupling protrusion 63 that is received into a complementary recess 72 of a rotary handle 71.

An inner end of the lead screw 65 terminates in a threaded point 69 that in use is screwed into a canal of a tooth root 49 by rotation of the handle 71. Once the threaded point 69 has been sufficiently screwed into the root 49 the handle 71 is removed. A spanner 73 is then placed over the nut 61 and used to rotate the nut 61 relative to the threaded portion 67 of the lead screw 65. The action of tightening the nut 61 causes its lower face to self-align with the upper surface of hemispherical swivel 59 in the hemispherical tray 57. This results in no bending moment being applied to lead screw 65. Thus, the lead screw 65 is translated away from the bone to which the root 49 is attached so that the root 49 is extracted from the underlying bone.

As such, the hemispherical swivel 59 functions as a pivoting member in that it can pivot relative to the tray to align with the tooth root 49.

In the embodiment shown in FIG. 21, the nut 61 rests directly on the hemispherical swivel 59. When the nut 61 is rotated to withdraw the lead screw 65, as the nut 61 is in contact with the hemispherical swivel 59, there is a risk that a rotational movement will be applied to the hemispherical swivel 59 or to the lead screw 65. In order to minimise or avoid rotation of the hemispherical swivel 59 or the lead screw 65, a thrust bearing (not shown) may be placed between the nut 61 and the hemispherical swivel 59. Rotation of the nut will then cause rotation of the thrust bearing, but there will be no rotation of the surface of the thrust bearing that is in contact with the hemispherical swivel 59.

As the nut 61 is rotated, the hexagonal coupling protrusion 63 may be used to prevent rotation of the lead screw 65, e.g. using the rotary handle 71.

Figure 24:
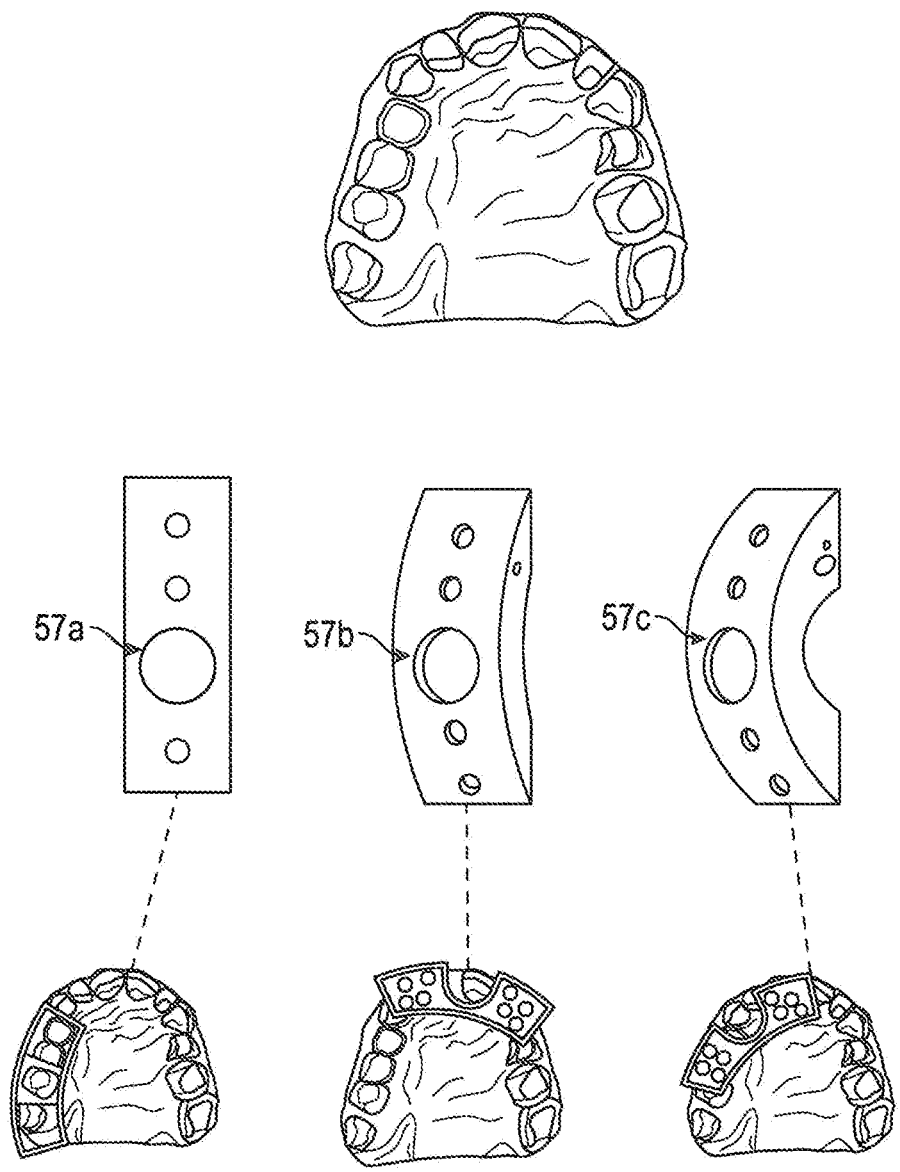
FIG. 24 depicts further trays for use of the tooth extraction instrument on anterior, posterior and canine teeth.
Figure 25:
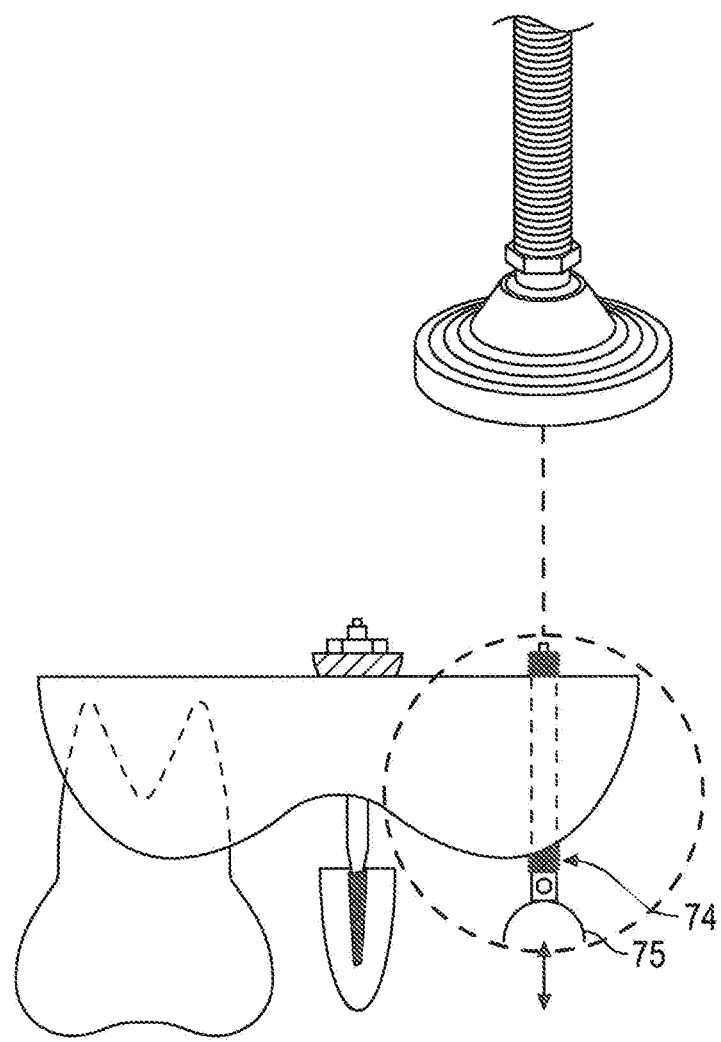
FIG. 25 illustrates a further embodiment of the root extraction instrument including a height adjustable post.
Figure 27:
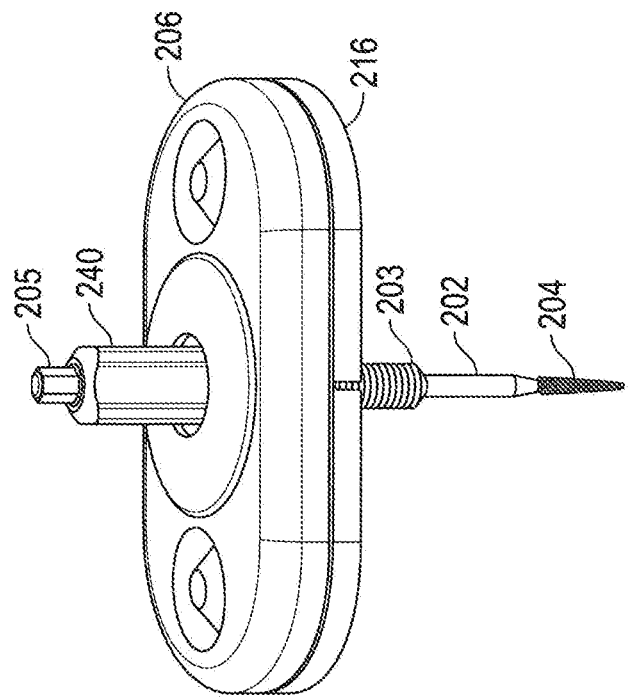
FIG. 27 shows a perspective view of the assembled device shown in FIG. 26.

Tray 57 may be provided in various configurations to accommodate different positions in the mouth. For example, FIG. 23 depicts a platform 57*a* that is designed to be used with molar teeth. FIG. 24 illustrates trays 57*a*, 57*b* and 57*c*, each having different shapes that are for use with posterior, anterior and canine teeth of the patient. FIG. 25 illustrates how a post 74 with an adjustable foot 75 may be provided to assist in supporting the tray where it is partially positioned over a toothless area of gum.

FIGS. 26 to 32 show various views of a device in accordance with another embodiment of the present invention for detaching a tooth root. The device 200 comprises a lead screw 202. The lead screw 202 includes a threaded point 204 that has a threaded region extending up the shaft from the point. The threaded portion 204 at the point of the lead screw 202 enables the threaded point of the lead screw to be screwed into a tooth root. This is common in a number of dental instruments and need not be described further, except to say that a number of different thread designs and tapers may be used. The upper end of the lead screw 202 may have an engagement region 205 at which a turning tool, such as a hand wheel, can engage with the screw to thereby enable the surgeon to rotate the screw. The lead screw 202 also includes a threaded region 203 on the shank of the lead screw 202.

The device comprises a platform 206. The platform 206 is made from a rigid material, such as stainless steel or a rigid plastic. The platform 206 includes a curved recess 208 having an opening 210 in a lower part thereof. The platform 206 also includes further openings 212, 214 that receive protruding lugs on a cushion member to thereby enable a cushion member 216 to be removably attached to the platform 206. The protruding lugs 218, 220 on the cushion member 216 can be partially seen in FIG. 26. It will be appreciated that the protruding lugs 218, 220 may be pressed through respective openings 212, 214 to thereby retain the cushion member in position relative to the platform 206. The protruding lugs 218, 220 may have oversized heads that become compressed as they are moved through the openings 212, 214 in the platform 206. Once the heads have passed through the openings, they can snap back to their normal size to thereby retain the cushion in position. The cushion may be made from two separate cushion parts, as can be best seen in FIG. 26.

The device is also provided with a pivoting member. The pivoting member comprises an upper member 222 in the form of a body having an opening or passage 223 passing through the body. The opening 223 has a threaded region 224 at its lower end. The upper member 222 has a curved outer surface 226 that is generally complementary in shape to the curved recess 208 of platform 206. The pivoting member also includes a lower member 228. Lower member 228 has a lower curved surface 230. The lower member 228 also includes a bore 232 that has a diameter that is somewhat larger than the outer diameter of the lead screw 202. A threaded region 234 enables the lower member 228 to be screwed into the complementary threaded region 224 in the lower part of the opening 223 in the upper member 222. In this manner, the lower member 228 can be connected to the upper member 222 to assemble the pivoting member 229.

Figure 32:
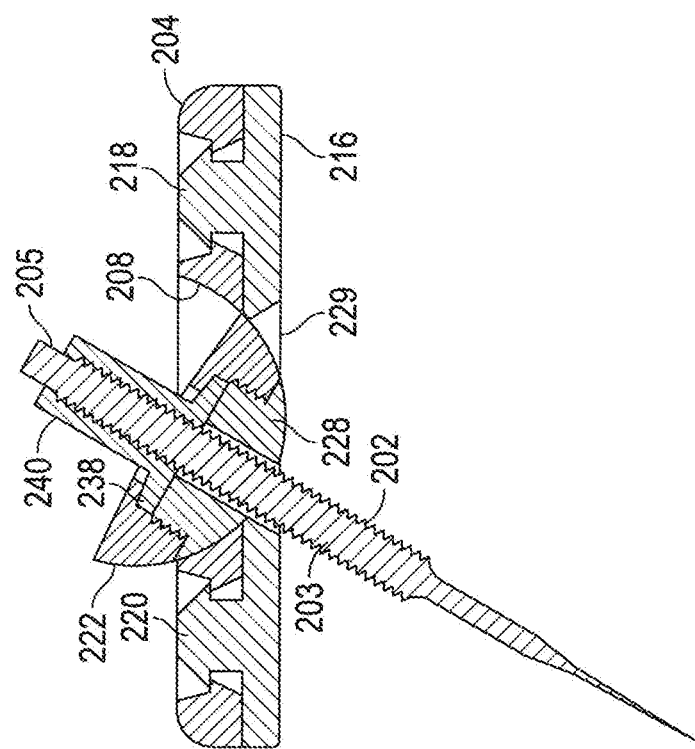
FIG. 32 is a cross sectional view taken along section J-J shown in FIG. 31.

Prior to connecting the lower member 228 to the upper member 222, a threaded nut 236 is positioned between the lower member 228 and the upper member 222. This results in the threaded nut 236 being captured between the lower member 228 and the upper member 222. The threaded nut 236 includes a flange 238 that is positioned between a shoulder extending around the upper part of the opening 223 in the upper member 222 and an upper surface of the threaded portion of the lower member 228. This is best shown in FIG. 32. In this manner, the threaded nut 236 can rotate relative to the pivoting member, but it is retained within the pivoting member.

Figure 26:
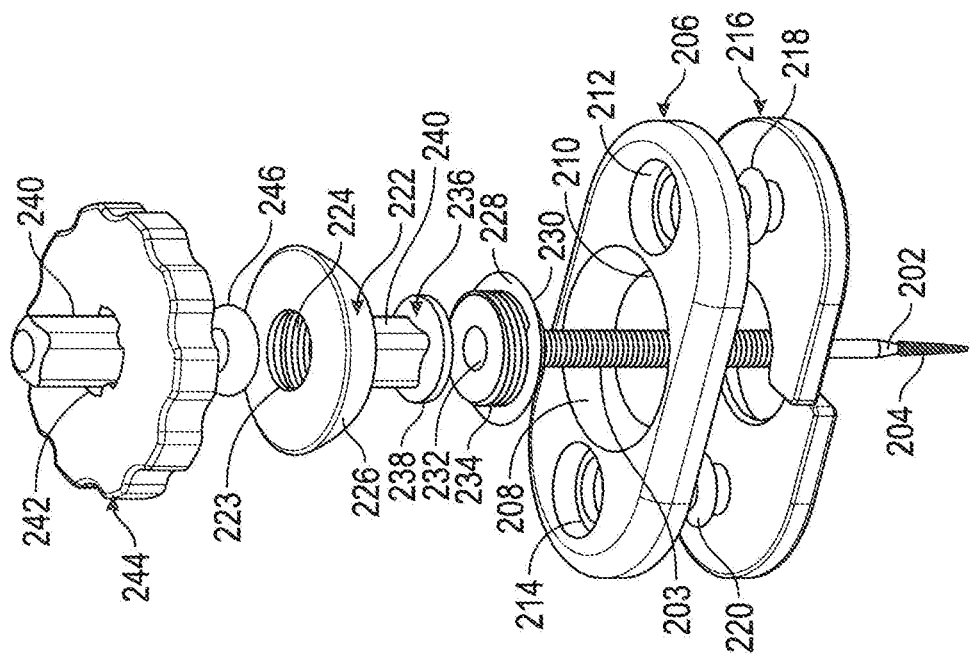
FIG. 26 shows an exploded view of a device in accordance with another embodiment of the present invention for detaching a tooth root.

The threaded nut 236 is provided with an outer engagement surface 240 that can engage with a rotating tool, such as a hand wheel or a spanner, to thereby enable the threaded nut 236 to be rotated by the surgeon. FIGS. 26 to 32 show this region as a square head region. However, other shaped regions, such as hexagonal shaped regions, may also be used. Further, other types of engagement services, such as slots or openings for screwdriver heads or Allen keys or sockets may also be used. In FIG. 26, the outer engagement surface 240 has also been drawn as extending through a central opening 242 of a turning wheel 244. It will be appreciated that other tools may also engage with the outer engagement surface 240 of the threaded nut 236. The turning wheel 244 also has an O-ring 246 to assist in seating the turning wheel 244 on the threaded nut 236.

As best shown in FIG. 32, when the upper member 222 and the lower member 228 are connected together, a pivoting member 229 is formed, the pivoting member 229 having a curved outer surface. Suitably, the outer surface of the pivoting member 229 is generally hemispherical in shape. The curved recess 208 of the platform is also suitably generally hemispherical in shape. In this manner, the pivoting member 229 can pivot relative to the curved recess 208.

Figure 33:
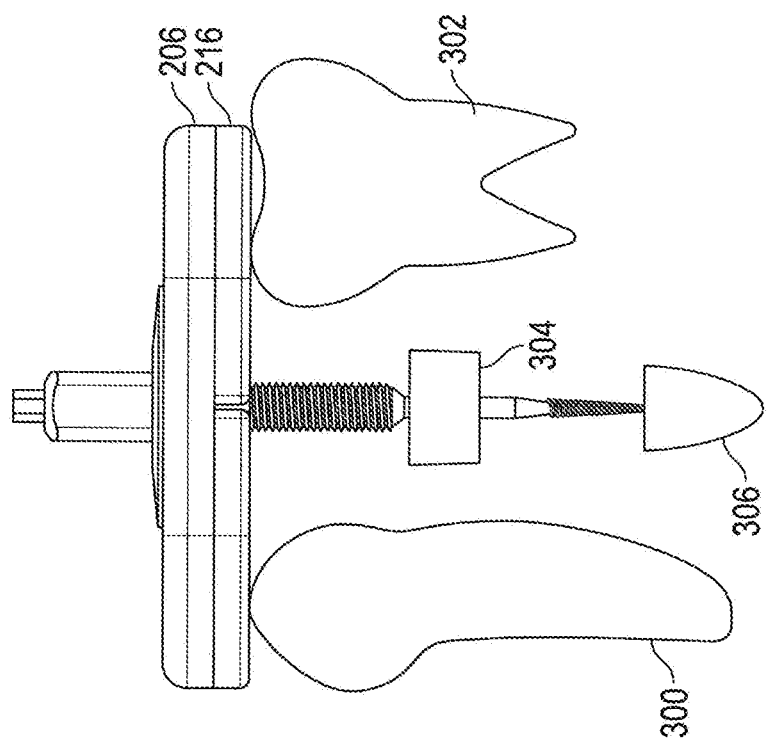
FIG. 33 is a schematic diagram showing the device of FIGS. 26 to 32 in use.

Operation of the device shown in FIGS. 26 to 32 is generally similar to operation of the device shown in FIGS. 21 to 23 and FIG. 33 shows a schematic view of the device in use. In this regard, the cushion 216 is attached to the platform 206 and the platform is placed on the teeth of the patient surrounding the site of the operation. In particular, the platform 206 and cushion 216 are placed on the teeth 300, 302 that are located on either side of the site of the operation. FIG. 33 also schematically shows the tooth ring 304 and the apices of the tooth root 306 (although the space between the tooth ring 304 and the tooth root 306 in FIG. 33 are shown at an exaggerated scale). The lead screw 202 is screwed into the threaded nut 236 such that the threaded region 203 of the lead screw 202 engages with the internal threads on the threaded nut 236. The pivoting member with the lead screw threadably engaged therewith is placed into the curved recess on the platform 206. The lead screw 202 is rotated to extend downwardly through the threaded nut 236 and through the tooth ring 304 until the threaded point 204 engages with the tooth root 306, with the threaded point 204 being screwed into the tooth root 306 to thereby effectively attach the lead screw 202 to the tooth root 306. Once that has occurred, the turning wheel 244 is then placed over the engagement region 240 of the threaded nut 236. The turning wheel is then operated by the surgeon to turn the threaded nut 236. As the lead screw 202 is effectively secured to the tooth root 306, the lead screw is prevented from rotating with the threaded nut 236. Consequently, rotation of the threaded nut 236 causes retraction of the lead screw, which also results in the tooth root 306 becoming detached from the gum/bone. Consequently, the tooth root is loosened and partially removed.

As the lead screw can pivot relative to the platform, the lead screw can self-align whilst the lead screw is being retracted to detach the tooth root. As a result, no bending moment is applied to the lead screw, which assists in ensuring satisfactory detachment of the tooth root from the underlying bone to which it is attached. Furthermore, this novel feature reduces the risk of the lead screw bending or breaking.

Figure 35:
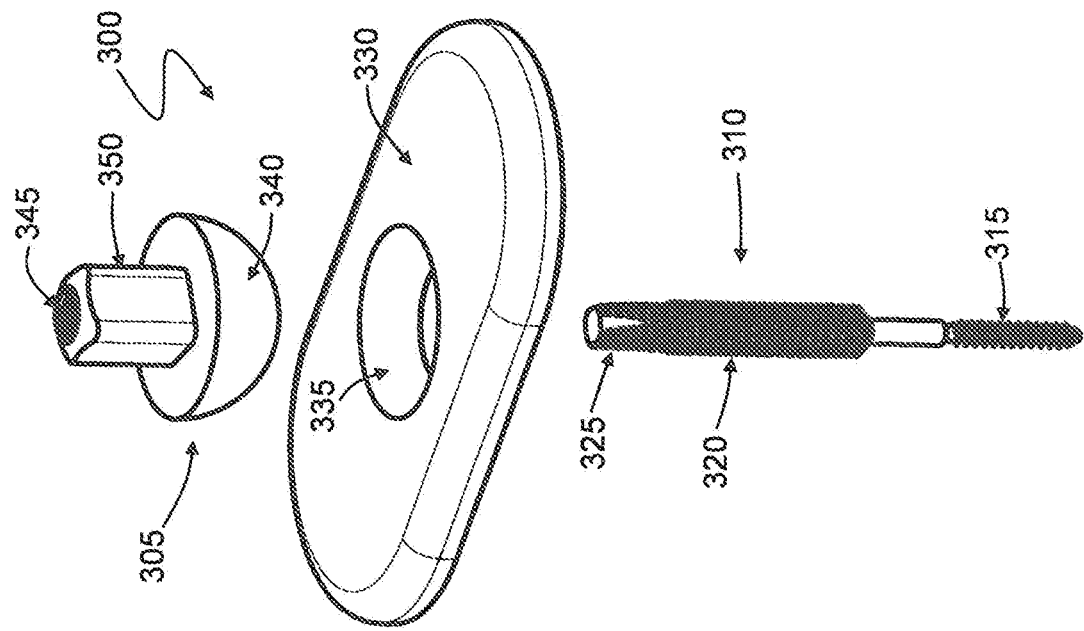
FIG. 35 is an exploded view of the device of FIG. 34.
Figure 34:
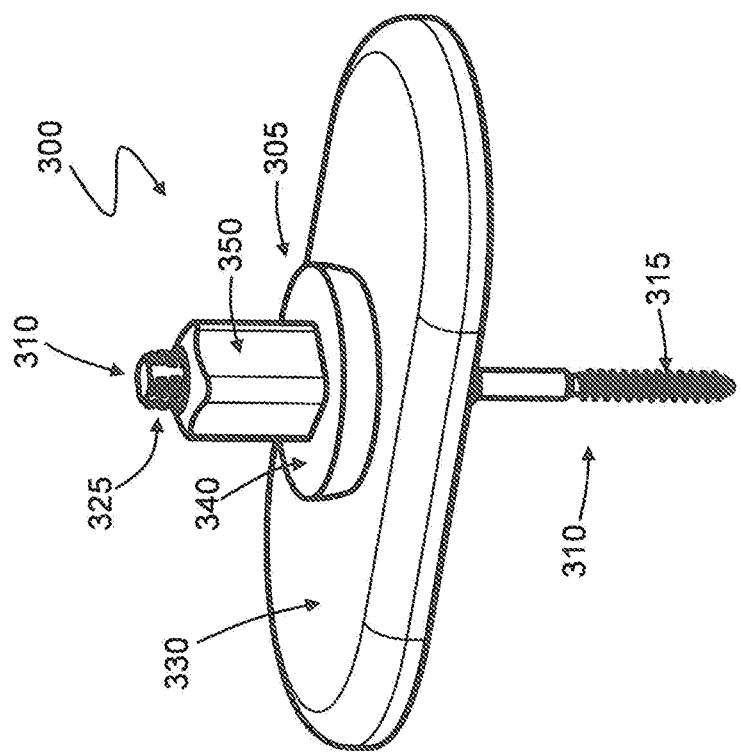
FIG. 34 is a perspective view of a device for detaching a tooth root, according to a further embodiment of the present invention.
Figure 36:
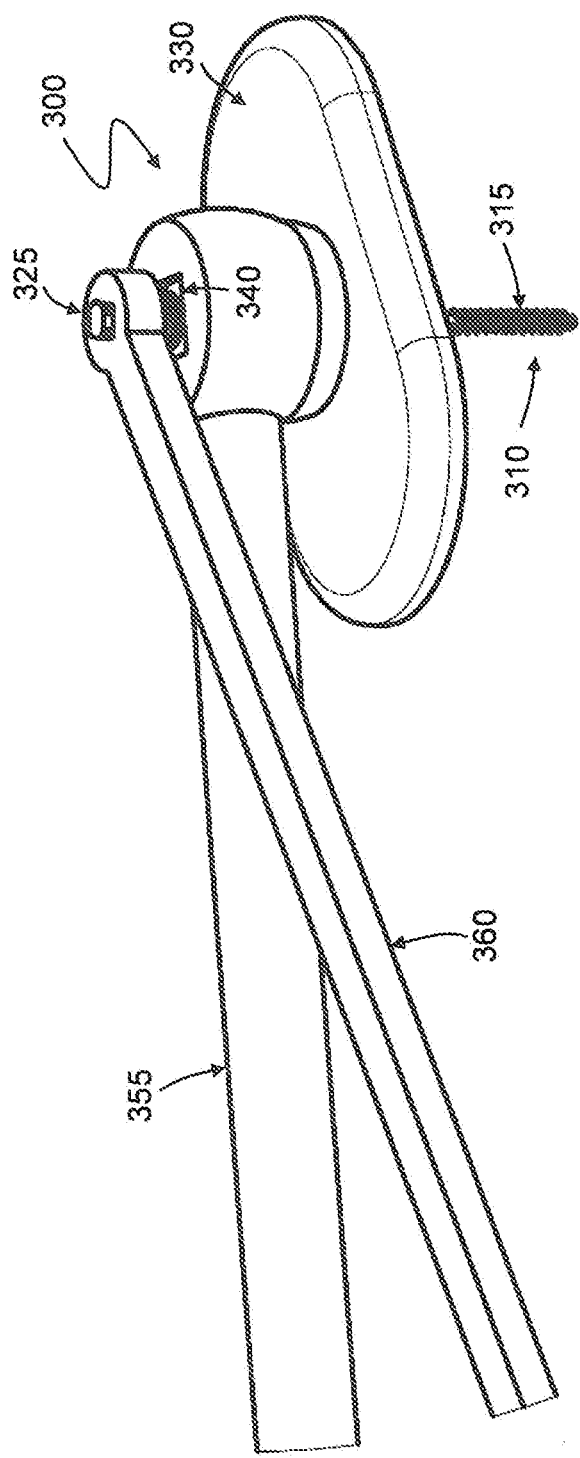
FIG. 36 illustrates a perspective view of the device of FIG. 34 in use.

FIGS. 34 to 36 show various views of a device 300 in accordance with yet another embodiment of the present invention for detaching a tooth root. The device 300 is similar to the devices 56 and 200 but comprises a unitary pivoting member 305.

The device 300 comprises a lead screw 310, similar to the lead screw 202, and includes a threaded point 315 on a lower end of the lead screw 310, to enable the lead screw 310 to be screwed into a tooth root. The lead screw 310 also includes a threaded shank portion 320 extending to an upper end of the lead screw 310, which has an engagement region 325 at an upper end thereof. The engagement region 325 enables a turning tool, such as a hand wheel, to engage with the screw 310 to thereby enable the surgeon to rotate the screw 310, or a locking tool, such as a locking spanner, to engage with the screw 310 to enable the surgeon to prevent rotation of the screw 310, as outlined in further detail below.

The device 300 comprises a platform 330, which is configured to be placed on the teeth of the patient surrounding the site of the operation, much like the platform 206. The platform 330 includes a curved recess 335 having an opening in a lower part thereof and is configured to receive a hemispherical base 340 of the pivoting member 305. The curved recess 335 is generally complementary in shape to the hemispherical base 340, which enables the pivoting member 305 to swivel and pivot within the curved recess 335.

The pivoting member 305 includes a threaded opening 345 that extends along a length of the pivoting member 305, which enables the lead screw 310 to be screwed into the pivoting member 305. In particular, internal threads of the threaded opening 345 of the pivoting member engage with the threaded shank portion 320 of the lead screw 310, much like the threaded nut 236.

The pivoting member 305 further comprises an upper engagement surface 350 in the form of a body having a lengthwise uniform cross section, to enable a rotating tool, such as a spanner, to engage with the pivoting member 305, thereby enabling the pivoting member 305 to be rotated by the surgeon.

In use, the lead screw 310 is rotated such that the threaded point 315 engages with, and is screwed into a tooth root, to thereby effectively attach the lead screw 310 to the tooth root 306. This may be achieved using a spanner or turning wheel that engages with the engagement region 325.

As the lead screw 310 can pivot relative to the platform 330, the lead screw 310 can be aligned with the tooth root while being attached to the device 300 through pivoting of the pivoting member. Furthermore, pivoting member may also the lead screw 310 to self-align when used, and as such, no bending moment is applied to the lead screw, in turn reducing the risk of the lead screw 310 bending or breaking.

Once the lead screw is secured into the tooth, the ratchet spanner 355 is placed over, and engaged with the upper engagement surface 350 of the pivoting member 305. The ratchet spanner 355 is open ended, which enables the engagement region 325 of the lead screw 310 to extend therethrough. A locking spanner 360 may then be placed over, and engaged with the engagement region 325 of the lead screw 310.

The ratchet spanner 355 may then be operated by the surgeon to rotate the pivoting member 305 while the locking spanner 360 is used to prevent the lead screw 310 from rotating. Rotation of the pivot member 305 relative to the lead screw 310 causes retraction of the lead screw 310, which thereby results in extraction of the tooth root. FIG. 36 illustrates the device 300 in use with the ratchet spanner 355 and the locking spanner 360 attached thereto.

The ratchet spanner 355 and the locking spanner 360 may be manually held in place (e.g. by the surgeon or an assistant). Alternatively, the locking spanner 360 may be coupled to a support, to prevent rotation of the lead screw 310 without requiring the locking spanner 360 to be manually held.

Other embodiments of the invention are provided that do not require the use of a locking spanner 360, but instead wherein rotation of the lead screw is prevented by the device itself, as outlined below.

FIGS. 37 to 40 show various views of a device 400, and components thereof, in accordance with yet another embodiment of the present invention for detaching a tooth root. The device 400 is similar to the devices 56, 200 and 300 but comprises a pivoting mechanism that prevents rotation of a lead screw, alleviating the need for a locking spanner.

In particular, the device 400 comprises a lead screw 405, similar to the lead screw 310, and includes a threaded point 410 on a lower end of the lead screw 405, to enable the lead screw 405 to be screwed into a tooth root, a threaded shank portion 415 extending to an upper end of the lead screw 405, and an engagement region 420 to enable a turning tool, such as a hand wheel, to engage with the screw 405.

The threaded shank portion 415 includes planar locking surfaces 425, which extend along a length of the threaded shank portion 415, and enable the lead screw 405 to be locked into position, as outlined in further detail below.

The device 400 comprises a platform in the form of a tray 430, which is configured to be placed on the teeth of the patient surrounding the site of the operation, much like the tray 57. The tray 430 includes an upper body, through which the lead screw 405 extends by way of a pivot mechanism, and inner and outer sidewalls 430a, 430b, also referred to as wings, extending downwardly therefrom.

The inner and outer sidewalls 430a, 430b are configured to be positioned on and inside and an outside of the site of the operation, and include apertures 435 for receiving and retaining silicone bumpers. In particular, silicon bumpers of different shapes and sizes may be incorporated into the baseplates to protect the teeth of the patient surrounding the tooth root when in use.

Figure 38:
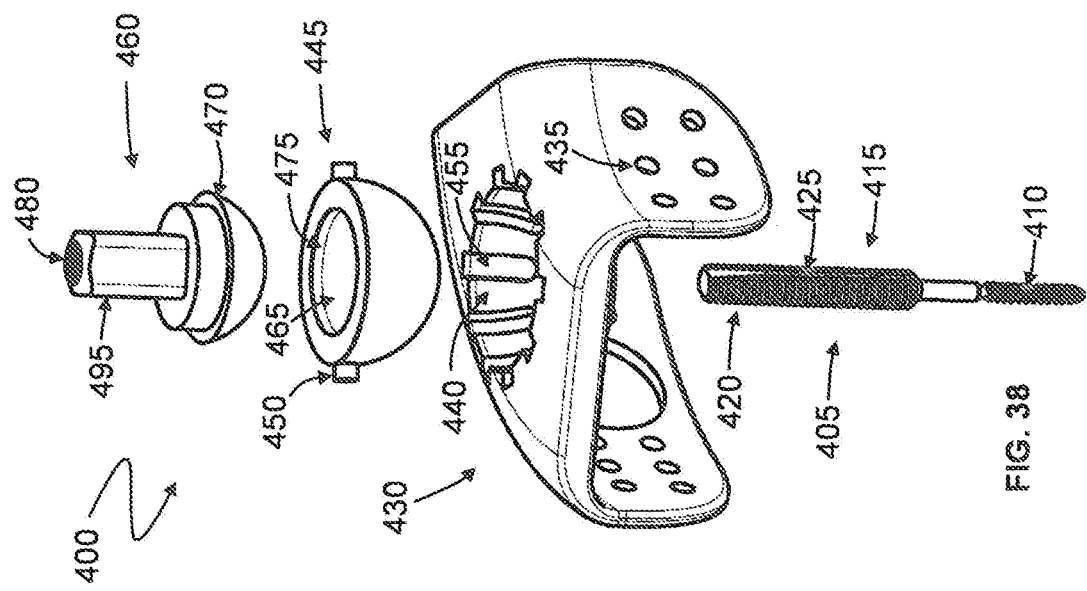
FIG. 38 is an exploded view of the device of FIG. 37.
Figure 37:
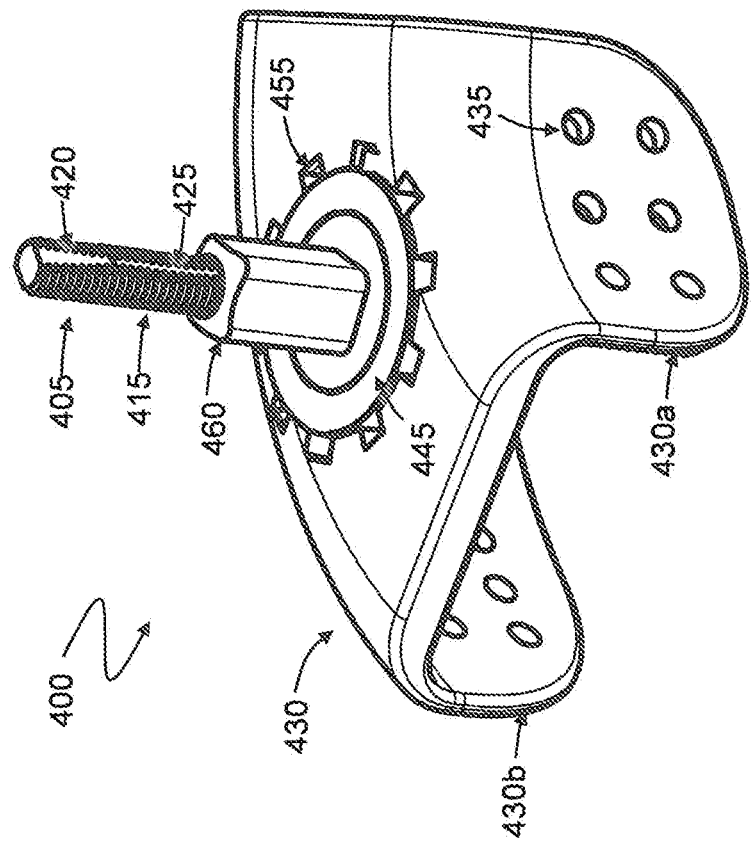
FIG. 37 is a perspective view of a device for detaching a tooth root, according to a further embodiment of the present invention.
Figure 39:
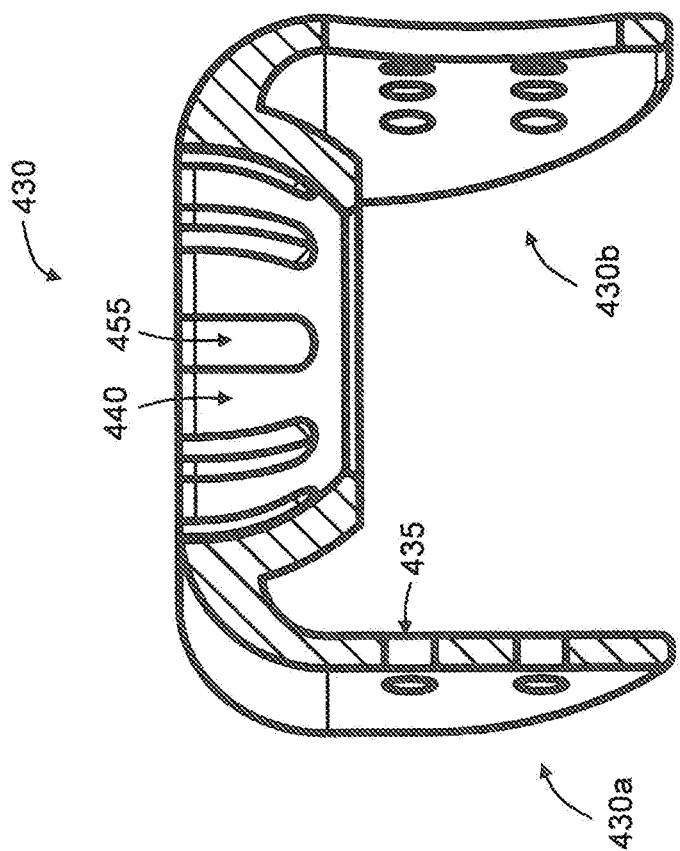
FIG. 39 is a cross sectional view of a tray of the device of FIG. 37.
Figure 44:
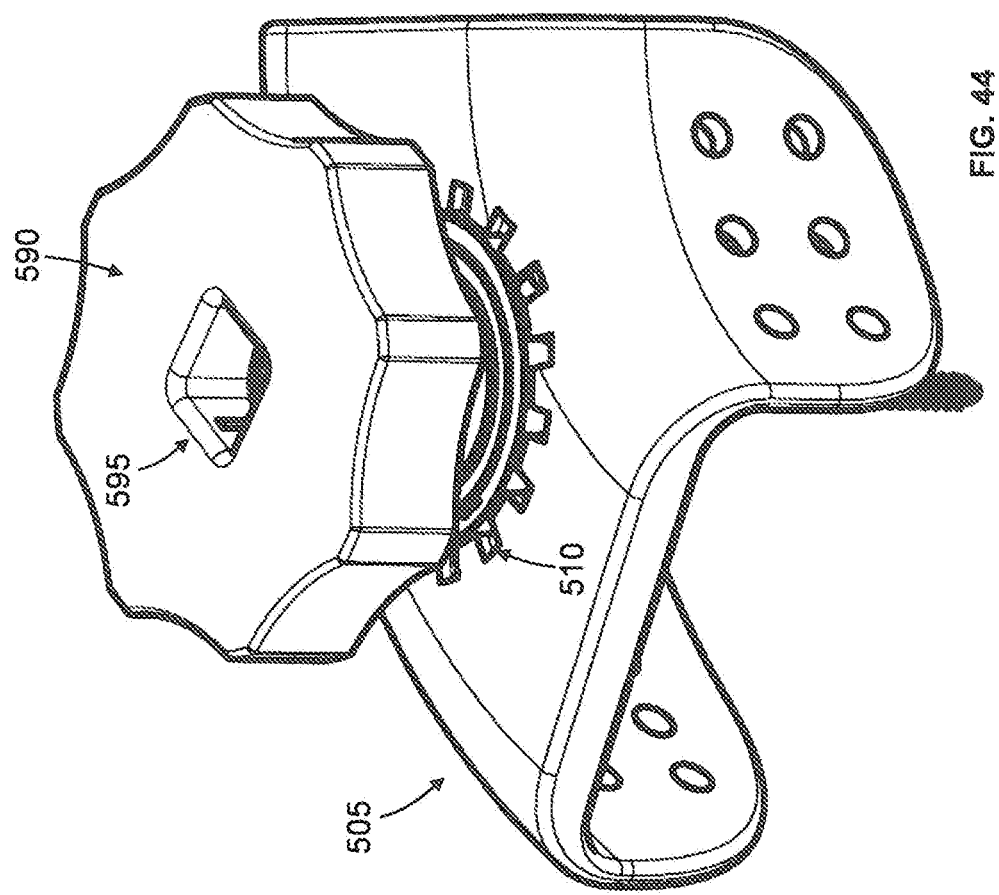
FIG. 44 is a perspective view of the device of FIG. 41 in use.

As best illustrated in FIGS. 38 and 39, the upper body of the tray 430 includes a hemispherical recess 440 having an opening in a lower part thereof and is configured to receive a hemispherical base 445 of a pivoting mechanism.

The hemispherical base 445 includes supports 450 on opposing upper edges thereof, which are configured to be received in grooves 455 of the hemispherical recess 440. The supports 450 enable the hemispherical base 445 to pivot around an axis defined by the pair of supports 450, and the grooves 455 enable the hemispherical base 445 to pivot along a direction of the grooves 455 in which the supports are received. As such, opposing pairs of grooves 455 function together as a channel along which the hemispherical base 445 may pivot.

The grooves 455 are spaced around the of the hemispherical recess 440 to enable the hemispherical base 445 to be positioned at an appropriate angle. The grooves 455 may be positioned at any suitable increment, but in one embodiment approximately 10 grooves are positioned around the hemispherical recess 440 enabling rotation in increments of around 36°.

A screw engagement member 460 engages with a recess 465 of the hemispherical base 445 in a press-fit arrangement. In particular, a flange 470 of the engagement member 460 engages with a lip 475 of the recess 465, to thereby retain the screw engagement member 460 into the recess 465.

The flange 470 and the lip 475 extend around a periphery of the screw engagement member 460 and recess 465, respectively, and are axially symmetrical. As a result, the screw engagement member 460 is able to rotate within the recess 465.

The screw engagement member 460 includes a threaded opening 480 which extends along a length of the screw engagement member 460, and which enables the lead screw 405 to be screwed into the screw engagement member 460. In particular, internal threads of the threaded opening 480 engage with the threaded shank portion of the lead screw 405, much like a threaded nut.

Figure 40:
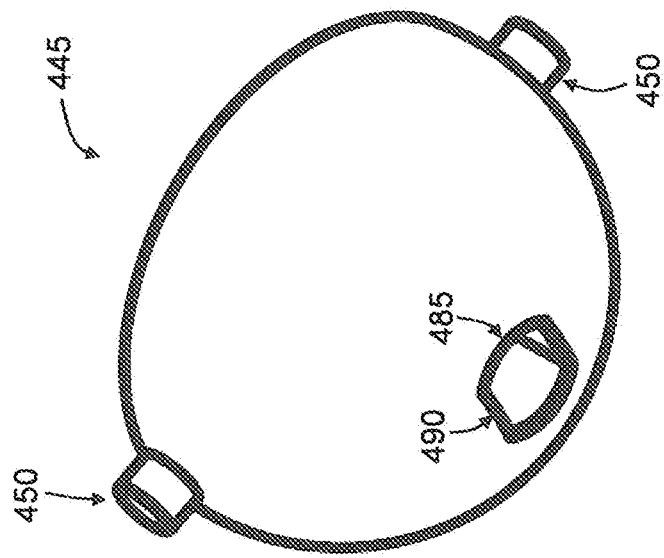
FIG. 40 is a lower perspective view of a portion of the device of FIG. 37.

As best illustrated in FIG. 40, the hemispherical base 445 includes a slotted aperture 485 at a base thereof. The slotted aperture 485 is sized such that linear sides 490 of the slotted aperture 485 engages with the planar locking surfaces 425 of the lead screw 405, and thereby prevent rotation of the lead screw 405 relative to the hemispherical base 445 and thereby to the tray 430 and in turn the tooth root.

The screw engagement member 460 includes an upper engagement surface 495 in the form of a body having a lengthwise uniform cross section, to enable a rotating tool, such as a spanner, to engage with the screw engagement member 460, thereby enabling the screw engagement member 460 to be rotated by the surgeon.

In use, the lead screw 405 is screwed into the tooth root using a hand wheel or spanner that engages with the engagement region 420 of the lead screw 405 until the screw is effectively attached to the tooth root. This is advantageously performed while the pivoting mechanism is disassembled from the tray.

The pivoting mechanism (i.e. the hemispherical base 445 and the screw engagement member 460) is then assembled in the tray 430 such that the screw extends up through the aperture 485 of the hemispherical base 445 and into the screw engagement member 460. At this point the hemispherical base 445 is rotationally locked to the tray 430 by the supports 450 in the grooves 455. As a result, the screw is unable to rotate relative to the tray 430.

As a lower surface of the hemispherical base 445 corresponds to an inner surface of the hemispherical recess 440, these surfaces of the hemispherical base 445 and the hemispherical recess 440 engage with each other to transfer an axial force applied to the hemispherical base 445 (e.g. from rotation of the screw 405) to the tray 430. As such, the supports 450 do not carry this entire axial force, which protects the supports 450.

A spanner or the like may then be placed over, and engaged with the upper engagement surface 495 of the screw engagement member 460. The spanner may then be operated by the surgeon to rotate the screw engagement member 460 relative to the lead screw 405 to cause retraction of the lead screw 405, which thereby results in extraction of the tooth root.

FIGS. 41 to 44 show various views of a device 500, and components thereof, in accordance with yet another embodiment of the present invention for detaching a tooth root. The device 500 is similar to the device 500 but comprises multiple pivoting hemispherical members.

In particular, the device 500 comprises the lead screw 405 including planar locking surfaces 425, identical to that of the device 400, and a platform in the form of a tray 505, similar to the tray 430. The tray 505 includes an upper body, similar to the tray 430, through which the lead screw 405 extends by way of a pivot mechanism, and inner and outer sidewalls 430a, 430b, extending downwardly therefrom. However, instead of the grooves 455, the tray 505 includes a plurality of retaining apertures 510 around a periphery of a hemispherical recess 515.

The hemispherical recess 515 is configured to receive a lower hemispherical gimbal portion 520, which in turn is configured to receive an upper hemispherical gimbal portion 525. The lower hemispherical gimbal portion 520 includes supports 530, which are configured to be received within a pair of the retaining apertures 510, which enables the lower hemispherical gimbal 520 to pivot around an axis defined by the pair of supports 530 and a pair of retaining apertures 510, while preventing rotation of the lower hemispherical gimbal 520.

The upper hemispherical gimbal portion 525 also includes a pair of supports 535, which are received within retaining apertures 540 of the lower hemispherical gimbal portion. The retaining apertures 540 are positioned at right angles to an axis defined by the supports 530. As such, the upper and lower hemispherical gimbal portions 530, 525 are able to rotate along axes orthogonal to each other.

The retaining apertures 510 enable the lower hemispherical gimbal 520 to be positioned such that it pivots along a direction of the retaining apertures 510 in which the supports 530 are received. As such, the retaining apertures 510 which are used may be selected such that the lower hemispherical gimbal 520 is positioned at an appropriate angle relative to the tray 505. The retaining apertures 510 may be positioned at any suitable increment, but in one embodiment approximately 16 retaining apertures 510 are positioned around the hemispherical recess 515 enabling rotation in increments of around 22.5°.

A screw engagement member 545, similar to the screw engagement member 460, engages with a recess 550 of the upper hemispherical gimbal portion 525 in a press-fit arrangement. In particular, a flange 555 of the engagement member 545 engages with a lip of the recess 550, to thereby retain the screw engagement member 545 into the recess 550, while enabling the screw engagement member 545 to rotate relative to the upper hemispherical gimbal portion 525. Furthermore, the screw engagement member 545 includes a threaded opening 565 which extends along a length of the screw engagement member 545, and which enables the lead screw 405 to be screwed into the screw engagement member 545.

Figure 43:
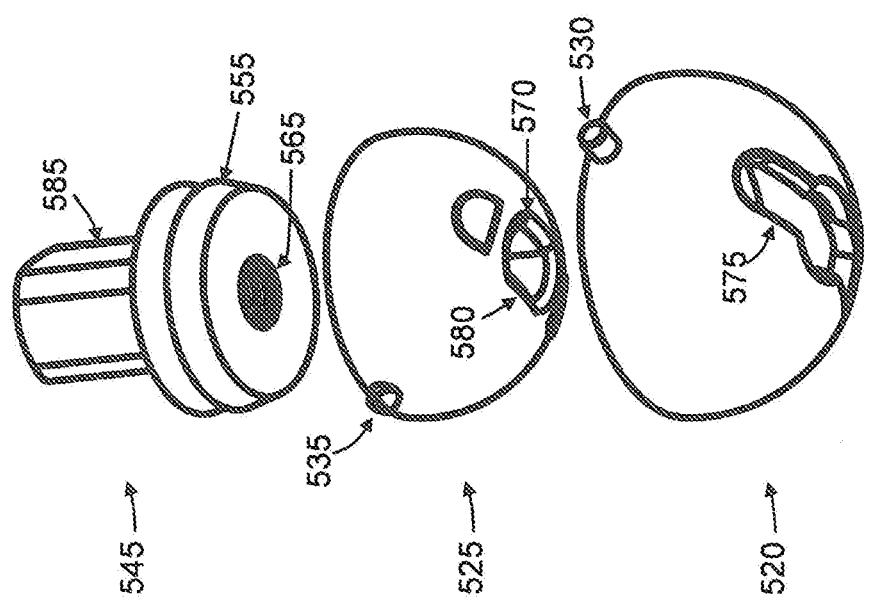
FIG. 43 is an exploded view of a portion of the device of FIG. 41.

As best illustrated in FIG. 43, the upper hemispherical gimbal portion 525 includes a slotted aperture 570 at a base thereof, and the lower hemispherical gimbal portion 520 includes an elongate slot 575 along the direction in which the upper hemispherical gimbal portion 525 may pivot.

The slotted aperture 570 is sized such that linear sides 580 of the slotted aperture 570 engage with the planar locking surfaces 425 of the lead screw 405, and thereby prevent rotation of the lead screw 405 relative to the upper hemispherical gimbal portion 525. The upper hemispherical gimbal portion 525 is unable to rotate relative to the lower hemispherical gimbal portion 520, which is unable to rotate relative to the tray 505 and in turn the tooth root, and thereby the lead screw is prevented from rotating (and importantly relative to the tooth root).

As a lower surface of the upper hemispherical gimbal portion 525 corresponds to an inner surface of the lower hemispherical gimbal portion 520, and a lower surface of the lower hemispherical gimbal portion 520 corresponds to an inner surface of the hemispherical recess 515, these surfaces of the upper hemispherical gimbal portion 525, the lower hemispherical gimbal portion 520 and the hemispherical recess 515 engage with each other to transfer an axial force applied to the upper hemispherical gimbal portion 525 (e.g. from rotation of the screw 405) to the tray 430. As such, the supports 530, 535 do not carry this entire axial force, which protects the supports 530, 535.

The screw engagement member 545 includes an upper engagement surface 585, much like the upper engagement surface 495, to enable a rotating tool, such as a spanner, to engage with the screw engagement member 545, thereby enabling the screw engagement member 545 to be rotated by the surgeon.

In use, the lead screw 405 is screwed into the tooth root using a hand wheel or spanner that engages with the engagement region 420 of the lead screw 405 until the screw is effectively attached to the tooth root, advantageously performed while the pivoting mechanism is disassembled from the tray 505.

The pivoting mechanism (i.e. the upper and lower hemispherical gimbal portions 525, 520 and the screw engagement member 545) is then assembled in the tray 505 such that the screw 405 extends up through the elongate slot 575 of the lower hemispherical gimbal portion 520, the slotted aperture 570 of the upper hemispherical gimbal portion 525 and into the screw engagement member 545. At this point the lower hemispherical gimbal portion 520 is rotationally locked to the tray 505 by the retaining apertures 510. As a result, the screw 405 is unable to rotate relative to the tray 505.

A hand wheel 590 (or similar tool) may then be placed over, and engaged with the upper engagement surface 585 of the screw engagement member 545. The hand wheel 590 may then be operated by the surgeon to rotate the screw engagement member 545 relative to the lead screw 405. Once the screw engagement member 545 is tightly engaged with the lead screw 405, the surgeon may change to a spanner or ratchet to enable more force to be applied to the screw engagement member 545 to cause retraction of the lead screw 405, which thereby results in extraction of the tooth root. The hand screw 590 includes a keyed aperture 595, adapted to fit the engagement surface 585.

Figure 46:
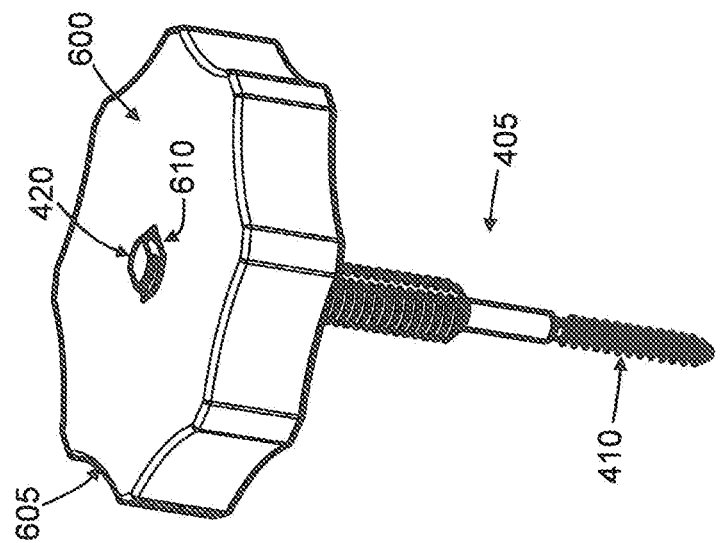
FIG. 46 is a perspective view of the lead screw and handle in assembled form.
Figure 45:
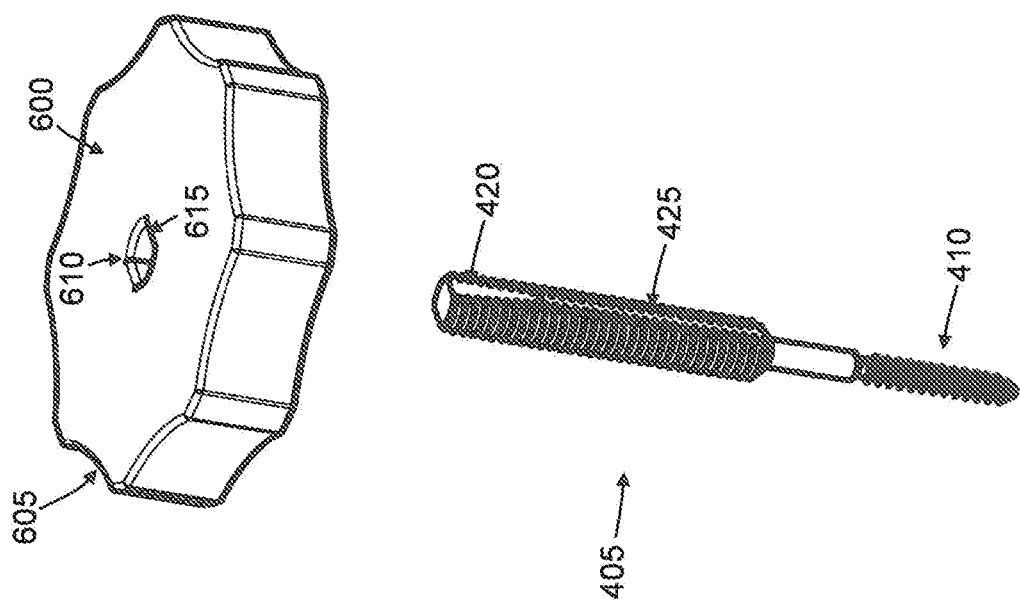
FIG. 45 is an exploded view of a lead screw according to an embodiment of the present invention and a handle.

As outlined above, the lead screw 405 includes an engagement region 420, which enables a tool such as a hand wheel to be engaged with the lead screw 405. FIG. 45 illustrates an exploded view of a lead screw 405 with a hand wheel 600, and FIG. 46 illustrates an assembled view of the lead screw 405 with the hand wheel 600 attached.

The hand wheel 600 includes a plurality of gripping portions 605 around a periphery thereof, and a keyed aperture 610 in a central portion thereof. The keyed aperture 610 includes planar sides 615 which engage with planar sides of the engagement region 420.

The planar sides of the engagement region 420 are tapered, which ensures a snug fit in the keyed aperture 610, which in turn provides improved stability and increased control.

Figure 48:
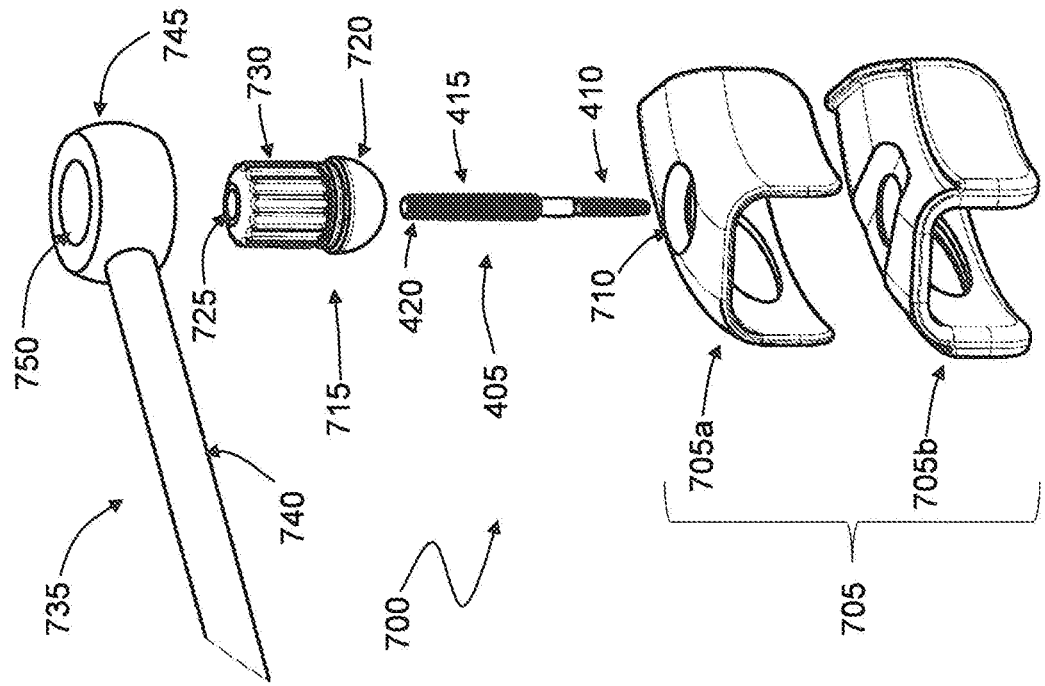
FIG. 48 illustrates an exploded view of the device of FIG. 47 in accordance with an embodiment of the present invention.
Figure 47:
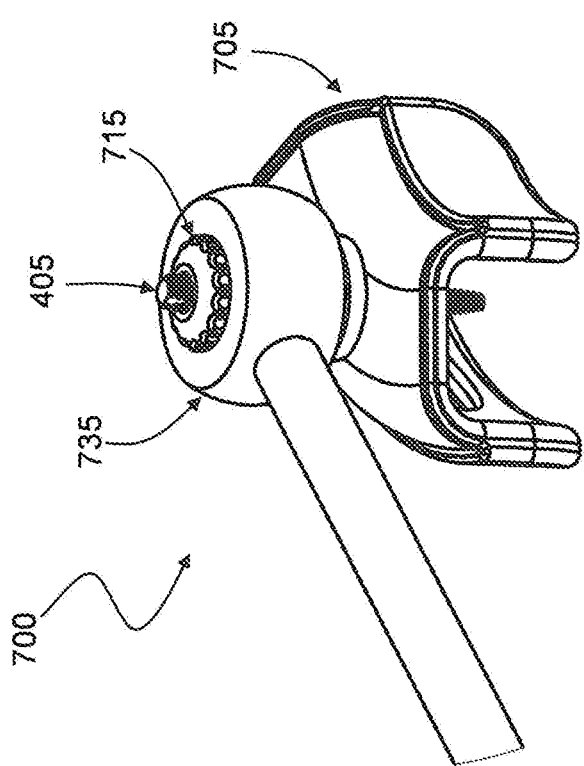
FIG. 47 illustrates an upper perspective view of a device in accordance with yet another embodiment of the present invention for detaching a tooth root.

FIGS. 47 and 48 show various views of a device 700, and components thereof, in accordance with yet another embodiment of the present invention for detaching a tooth root. The device 700 is similar to the device 500 but comprises a ratchet nut to simplify extraction.

The device 700 comprises the lead screw 405 including planar locking surfaces 425, identical to that of the device 500, and a platform in the form of a tray 705, similar to the tray 505. The tray 705 includes an upper body, through which the lead screw 405 extends by way of a pivot mechanism, and inner and outer sidewalls, extending downwardly therefrom, much like the tray 505. The tray 705 is formed of an upper tray portion 705a, and a lower tray portion 705b, and a hemispherical recess 710 is provided in the upper tray portion 705, similar to that of the tray 505, but without retaining apertures 510.

The device includes a ratchet nut 715 which engages with the lead screw 405 and the hemispherical recess 710. In particular, the hemispherical recess 710 is configured to receive a lower hemispherical portion 720 of the ratchet nut 715. Such configuration enables the ratchet nut 715 to pivot, thereby enabling retraction of the lead screw 405 in any direction.

The ratchet nut 715 includes a threaded bore 725 which extends axially along a length of the ratchet nut 715, and which enables the lead screw 405 to be screwed into the bore 725.

The threaded bore 725 is provided within a body 730 comprising a gear with teeth that extend around a periphery of the body defining a spline-shaped outer surface. In particular, the outer surface comprises a plurality of equally spaced teeth with rounded spacing therebetween. The teeth extend along an axial direction of the body 730, and thereby provide a body 730 having a uniform outer cross-section lengthwise along its axis.

The teeth are adapted to engage with a pawl of a ratchet spanner 735 that engages with the teeth in one direction only. In particular, a pivoting, spring-loaded pawl that engages with the teeth in one direction only is provided in an opening 750 of a head portion 745 of the spanner 735, such that when the spanner 735 is rotated in the one direction, the pawl engages with the teeth, thereby causing rotation of the ratchet nut 715 thereby. In the other direction, the pawl slides up and over the teeth, thereby preventing any rotation. To achieve this the pawl is asymmetrically positioned relative to the teeth in the spanner 735. As the opening 750 extends through the spanner, and the pawl is asymmetrically positioned therein, bi-directional operation of the ratcheting mechanism may be achieved by inverting the spanner.

While the above illustrates one example of a ratcheting mechanism, the skilled addressee will readily appreciate that any suitable ratcheting mechanism may be used.

The ratchet nut 725 may be screwed onto the threaded shank portion 415 of the lead screw 405 by hand, until it engages with the hemispherical recess 710. At this point, the ratchet nut 730 will become hard to turn by hand alone, and a spanner 735 may be engaged.

The spanner 735 includes an elongate handle 740, to provide leverage, with the head portion 745 at an end thereof such that rotational force is transferred from the spanner 735 onto the ratcheting body.

In use, the lead screw 405 is screwed into the tooth root using a hand wheel or spanner that engages with the engagement region 420 of the lead screw 405 until the screw is effectively attached to the tooth root. This is advantageously performed while the tray 705 alone is in place (i.e. without the ratcheting nut 715).

The ratcheting nut 715 is then screwed down onto the screw 405 until the lower hemispherical portion 720 engages with the hemispherical recess 710.

The spanner 735 may then be placed over, and engaged with the ratchet nut 715. The spanner 735 may then be operated by the surgeon in a ratchet-like manner to rotate the ratchet nut 715 relative to the lead screw 405. The spanner 735 enables more force to be applied to the ratchet nut 715. As the ratchet nut 715 is further rotated, the lead screw 405 is retracted, which thereby results in extraction of the tooth root.

As outlined above, the lead screw 405 includes an engagement region 420, which enables a tool such as a hand wheel to be engaged with the lead screw 405. As the top of the lead screw extends out from above the ratcheting nut 715, such tool may be used together with the spanner 735, to assist in preventing the lead screw 405 from rotating.

While not illustrated, the lead screws may include a square cut thread, particularly in the shaft portion, to reduce the rotational forces applied to the screws by the screw engagement members, which function as a nut, and to provide strength to the thread of the screws.

The inventor believes that the ability to lock the screw, to prevent rotation, reduces the likelihood unwanted forces being applied to the screw, which may in turn reduce the likelihood of breaking the tooth root.

The inventor believes that the extraction tools may be made sufficiently compact to be used in relation to posterior teeth where line and pulley extraction tools such as the Benex may be difficult to utilise. Furthermore, the inventor believes that the extraction tools may be stronger than line-based extraction tools, as they are not reliant on a line which may break under high loads, which may be the case for posterior teeth.

The inventor has found that embodiments of the previously described method for placement of dental implants may be practiced quickly so that the time that the patient is subjected to the procedure is relatively brief. Furthermore, the step of making the tooth ring and then subsequently withdrawing the extracted root through the ring addresses the difficulties that have been previously described in relation to the Socket Shield and Pontic Shield technique. Namely, it is not necessary to lever sectioned tooth from the bone and the difficulty of leaving a buccal root segment is avoided.

The present inventor believes that leaving the tooth ring in the gum socket will reduce or prevent alveolar resorption over time. In particular, the tooth ring provides a ring of natural tooth material in the gum socket. This reinforces the coronal part of the gum socket. Further, resorption is likely to be minimised as the tooth material is a natural material of the body.

Embodiments of the present invention also involve significantly less trauma to the gum socket then the "Socket Shield" technique. This results in less pain and discomfort to the patient and to a quicker recovery time from surgery.

While the above described devices are particularly suited for use in the method disclosed, the devices have much broader application than the method described. As an illustrative example, the devices described above may be used to remove a tooth root as part of a modified Socket Shield or Pontic Shield method, or for tooth extraction more generally. Similarly, the ratchet nut may be used in other contexts, including in medical contexts more generally.

In compliance with the statute, the invention has been described in language more or less specific to structural or methodical features. The term "comprises" and its variations, such as "comprising" and "comprised of" are used throughout in an inclusive sense and not to the exclusion of any additional features. It is to be understood that the invention is not limited to specific features shown or described since the means herein described comprises preferred forms of putting the invention into effect. The invention is, therefore, claimed in any of its forms or modifications within the proper scope of the appended claims appropriately interpreted by those skilled in the art.

Throughout the specification and claims (if present), unless the context requires otherwise, the term "substantially" or "about" will be understood to not be limited to the value for the range qualified by the terms.

Any embodiment of the invention is meant to be illustrative only and is not meant to be limiting to the invention. Therefore, it should be appreciated that various other changes and modifications can be made to any embodiment described without departing from the spirit and scope of the invention.

The invention claimed is:

1. A device for detaching a tooth root comprising:
   a lead screw having a threaded point for screwing into the tooth root, and a threaded shaft;
   a pivoting member including a bore through which the lead screw passes, the lead screw being retractable through the bore by rotational engagement of a threaded member with the threaded shaft of the lead screw; and
   a platform for supporting the pivoting member such that the lead screw is able to pivot relative to the platform,
   wherein the lead screw includes a locking surface for preventing rotation of the lead screw during rotational engagement of the threaded member with the threaded shaft.

2. The device of claim 1, wherein the threaded member comprises at least part of the pivoting member, such that rotation of the at least part of the pivoting member relative to the lead screw causes the lead screw to retract through the bore.

3. The device of claim 1, wherein the locking surface comprises a locking surface at an end of the lead screw or a planar face on a side of the threaded shaft.

4. The device of claim 3, wherein the locking surface comprises the planar face and the planar face extends substantially along a length of the threaded shaft.

5. The device of claim 3, wherein the locking surface comprises the planar face and the planar face is configured to engage with an aperture of the pivoting member, to prevent rotation of the lead screw.

6. The device of claim 1, wherein the platform has a curved recess, the curved recess having an opening in the lower part thereof, the lead screw passing through the opening in the curved recess, and wherein the pivoting member comprises a curved region of complementary shape to the curved recess in the platform, the curved region of the pivoting member being received in the curved recess of the platform.

7. The device of claim 6, wherein the curved region of the pivoting member comprises a hemispherical region.

8. The device of claim 1, wherein the pivoting member comprises a ratchet nut, the ratchet nut having an outer body defining a plurality of teeth, and a threaded bore for engaging with threads of a lead screw, the outer body adapted to engage with a pawl of a ratchet spanner such that rotation of the ratchet spanner in one direction causes rotation of the ratchet nut and rotation of the other direction does not cause rotation of the ratchet nut.

9. The device of claim 1, wherein the pivoting member includes a gimbal portion having first and second supports, the gimbal portion pivotable around an axis of the first and second supports.

10. The device of claim 9, wherein the pivoting member includes first and second gimbal portions, the first and second gimbal portions rotatable around orthogonal axes.

11. The device of claim 10, wherein the platform includes retaining apertures, in which supports of the gimbal portion are received.

12. The device of claim 11, wherein a plurality of retaining apertures are positioned around a periphery of a curved recess, enabling rotation of the gimbal portion around the curved recess by positioning the supports in a pair of the retaining apertures.

13. The device of claim 9, wherein the platform includes grooved channels, in which supports of the gimbal portion are received, the grooved channels enabling the gimbal portion to pivot around an axis perpendicular an axis of the supports by enabling the supports to travel lengthwise along the channels.

14. The device of claim 13, wherein the grooved channels are configured prevent rotation of the gimbal around the curved recess when in use.

15. The device of claim 13, wherein a plurality of grooved channels are positioned around a periphery of a curved recess, enabling rotation of the gimbal portion around the curved recess by positioning the supports in one or more of the grooved channels.

16. The device of claim 1, wherein the pivoting member includes a first portion, which is locked to prevent the screw from being rotated, and a second portion, which may rotate.

* * * * *